United States Patent
Jeong et al.

(10) Patent No.: US 11,312,014 B2
(45) Date of Patent: Apr. 26, 2022

(54) SYSTEM AND METHOD FOR ROBOTIC GRIPPING UTILIZING DYNAMIC COLLISION MODELING FOR VACUUM SUCTION AND FINGER CONTROL

(71) Applicant: Kindred Systems Inc., San Francisco, CA (US)

(72) Inventors: Jun Jeong, San Francisco, CA (US); Bryan Whittington, San Francisco, CA (US); Petr Lipay, San Mateo, CA (US); Thomas John Hummel, San Mateo, CA (US); David Gabriel Hallock, San Francisco, CA (US); Adrian Martin, San Francisco, CA (US); Hugo Seize, San Francisco, CA (US); Kevin George, San Francisco, CA (US); Sara Wojciechowski, San Francisco, CA (US); Nicholas Keyes, San Francisco, CA (US); Adam Rizkalla, Oakland, CA (US)

(73) Assignee: Kindred Systems Inc., San Francisco, CA (US)

( * ) Notice: Subject to any disclaimer, the term of this patent is extended or adjusted under 35 U.S.C. 154(b) by 283 days.

(21) Appl. No.: 16/565,186

(22) Filed: Sep. 9, 2019

(65) Prior Publication Data
US 2020/0078939 A1    Mar. 12, 2020

Related U.S. Application Data

(60) Provisional application No. 62/729,258, filed on Sep. 10, 2018.

(51) Int. Cl.
*B25J 9/16* (2006.01)
*B25J 15/00* (2006.01)
*B25J 15/06* (2006.01)
*B25J 15/08* (2006.01)
*B25J 19/04* (2006.01)

(52) U.S. Cl.
CPC .......... *B25J 9/1612* (2013.01); *B25J 9/1676* (2013.01); *B25J 9/1697* (2013.01); *B25J 15/0028* (2013.01); *B25J 15/0616* (2013.01); *B25J 15/08* (2013.01); *B25J 19/04* (2013.01)

(58) Field of Classification Search
CPC .... B25J 9/1612; B25J 15/0616; B25J 9/1697; B25J 19/04; B25J 15/0028; B25J 15/08; B25J 9/1676
USPC ......................................................... 294/185
See application file for complete search history.

(56) References Cited

U.S. PATENT DOCUMENTS

| | | | | |
|---|---|---|---|---|
| 9,044,858 | B2 * | 6/2015 | Ito | B25J 9/1612 |
| 9,434,070 | B2 * | 9/2016 | Satou | B25J 9/1612 |
| 10,639,790 | B1 * | 5/2020 | Bacon | B65B 57/14 |
| 10,800,045 | B1 * | 10/2020 | Jonas | B25J 15/028 |

(Continued)

*Primary Examiner* — Paul T Chin
(74) *Attorney, Agent, or Firm* — Seed Intellectual Property Law Group LLP

(57) ABSTRACT

The present disclosure generally relates to a robotic gripping system and method that utilizes vacuum suction and finger grasping, wherein the suction and grasping are actuated based on a dynamic collision model. In an exemplary embodiment, the present disclosure is directed to generating collision scenes of a surrounding environment which is used to determine possible collisions in a motion path, and which is used to selectively actuate the vacuum suction and/or finger grasping.

7 Claims, 21 Drawing Sheets

(56) References Cited

U.S. PATENT DOCUMENTS

| | | | | |
|---|---|---|---|---|
| 11,084,173 B2* | 8/2021 | Katagiri | ................. | B25J 9/1676 |
| 11,148,295 B2* | 10/2021 | Correll | .................... | B25J 9/106 |
| 11,182,633 B2* | 11/2021 | Suzuki | ................. | G06K 9/6259 |
| 2017/0028561 A1* | 2/2017 | Yamada | ................. | B25J 13/082 |
| 2017/0129101 A1* | 5/2017 | Sonoda | ................. | B25J 9/1697 |
| 2017/0282363 A1* | 10/2017 | Yamada | ................. | B25J 9/1612 |
| 2018/0250823 A1* | 9/2018 | Shimodaira | ............ | B25J 9/1697 |
| 2018/0290307 A1* | 10/2018 | Watanabe | .............. | B25J 9/1676 |
| 2021/0069904 A1* | 3/2021 | Duan | .................... | B25J 19/023 |

* cited by examiner

SYSTEM AND METHOD FOR ROBOTIC GRIPPING UTILIZING DYNAMIC COLLISION MODELING FOR VACUUM SUCTION AND FINGER CONTROL

CROSS-REFERENCE TO RELATED APPLICATION

This application is related to, and claims benefit of and priority from Provisional Application No. 62/729,258 filed Sep. 10, 2018, the complete subject matter of which is hereby incorporated herein by reference in its entirety.

BACKGROUND

Field

Embodiments of the present disclosure relate generally to the field of robotic gripping systems, and methods of control thereof, in order to manipulate objects for various purposes, such as, for example, picking, sorting, handling, packaging, and assembly.

Description of Related Art

Common robotic end effectors with gripping functionality are frequently highly complex, and highly customized to match the handled work piece. The end effectors may require various sensing mechanisms to assist the robotic system in locating, handling, and positioning objects of varying sizes, dimensions, colors, etc. However, current systems have in in handling irregularly-shaped objects, and current robotic system are limited in their ability to be widely used for different object types. Thus, current robotic systems are typically custom-made for specific applications, environments, and object-types. Thus, multiple end effectors are required in environments where different object types are being handled.

Furthermore, existing robotic grippers that incorporate vacuum suction are limited in the size, dimensions, and weight of objects that they can manipulate, as vacuum suction inherently requires a threshold flat or smooth area available for grasping. Existing robotic grippers that incorporate fingers or which mimic human hands can oftentimes be too large or bulky to isolate or manipulate smaller objects, or which cannot precisely grip a single object from a group of closely bundled objects, such as in a sorting bin.

In addition, conventional robotic grippers having independent movement in various joints of an extendable arm, such as a wrist or elbow, are able to move along a plurality of paths about a 360-degree axis. The ability to move independently along this axis increases the flexibility of the robotic gripper and allows the robotic gripper to potentially reach more areas, objects and locations within its surrounding environments. The increased capability to move along arbitrary paths increases the likelihood of collisions between the robotic gripper and various objects or obstacles in the environment, as well as with other robotic grippers which may be operating in the same environment.

Conventional robotic grippers typically include a plurality of linkages that are interconnected via driven joints, such as via motors. Each joint typically represents one or more independently controlled end-effectors, and the joint can allow for a degree of freedom. End-effectors typically include as robotic fingers, grippers, and can be used for grasping and moving of an object, assembling components, packing objects, and other various tasks. Currently, motion control logic is used in to attempt to achieve a required level of robotic mobility, dexterity, and work task-related functionality. End-effectors typically approach and leave from a specified target position according to a pre-defined path or route. Current motion control logic typically utilizes paths are typically pre-planned and not dynamic. However, conventional end-effector path planning techniques may be less than optimal when encountering dynamic obstacles in the work environment.

Therefore, there is a need for a robotic gripper that benefits from both vacuum suction gripping, and stabilizing fingers, in order to provide an object-agnostic gripping system that overcomes the aforementioned limitations associated with current robotic gripping systems, and which can dynamically avoid collisions using modelling.

SUMMARY

In one embodiment, the disclosure relates to a robotic apparatus for manipulating objects, including: a vacuum port configured to provide a vacuum suction force; at least two gripping structures each having respective finger portions, the gripping structures positioned proximate to the vacuum port; and a controller configured to provide actuation commands to the vacuum port and the gripping structures, wherein the controller utilizes a dynamic collision model for motion planning.

The robotic apparatus may further include a contact sensor located on at least one of the finger portions.

The dynamic collision model may utilize a collision scene generated from an image or video of a surrounding environment. The controller may be configured to selectively and individually actuate the vacuum port and the gripping structures. The controller may be configured to selectively actuate only the vacuum port if the collision scene indicates a possible collision if the gripping structures are actuated. The controller may be configured to actuate both the vacuum port and the gripping structures if the collision scene does not indicate a possible collision if the gripping structures are actuated. The controller may be configured to selectively and individually actuate each gripping structure of the at least two gripping structures. The dynamic collision model may utilize an iterative process with feedback.

In another embodiment, the disclosure relates to a robotic apparatus for manipulating objects, including: a vacuum port configured to provide a vacuum suction force; at least two gripping structures each having respective finger portions, the gripping structures positioned proximate to the vacuum port; and a controller configured to provide actuation commands to the vacuum port and gripping structures, wherein the controller is configured to generate a collision scene of a surrounding environment to determine a motion path, and wherein the controller is further configured to utilize an iterative feedback loop to modify the motion path if the collision scene indicates a possible collision.

The robotic apparatus may further include a contact sensor located on at least one of the finger portions.

The collision scene may be generated from an image or video of a surrounding environment. The controller may be configured to selectively and individually actuate the vacuum port and the gripping structures. The controller may be configured to selectively actuate only the vacuum port if the collision scene indicates a possible collision if the gripping structures are actuated. The controller may be configured to actuate both the vacuum port and the gripping structures if the collision scene does not indicate a possible collision if the gripping structures are actuated. The controller may be configured to selectively and individually actuate each gripping structure.

In yet another embodiment, the disclosure relates to a method of controlling a robotic apparatus for manipulating objects, including: capturing an image of an environment surrounding the robotic apparatus; generating a collision scene from the image, wherein the collision scene indicates the presence or absence of objects in the environment surrounding the robotic apparatus; generating a first pose for the robotic apparatus; generating a motion path for the robotic apparatus; determining if the first pose will allow the robotic apparatus to complete the motion path based on comparing the motion path to the collision scene; and generating a second pose if the first pose does not allow the robotic apparatus to complete the motion path.

The first and second poses may include a specific orientation of at least one finger coupled to the robotic apparatus. The first and second poses may include a specific orientation of at least two fingers coupled to the robotic apparatus. The collision scene may be generated based on capturing an image within a threshold area surrounding the robotic apparatus.

The method of controlling a robotic apparatus for manipulating objects may further include modifying the motion path if the first pose or the second pose does not allow the robotic apparatus to complete the motion path.

The motion path may include waypoints between a start state and an end state. The first pose and the second pose may include an extension distance for a suction gripper coupled to the robotic apparatus.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

It should be understood that aspects of the present disclosure are described herein with reference to the figures, which show illustrative embodiments. The illustrative embodiments herein are not necessarily intended to show all embodiments in accordance with the present disclosure, but rather are used to describe a few illustrative embodiments. Thus, aspects of the present disclosure are not intended to be construed narrowly in view of the illustrative embodiments. In addition, although the present disclosure is described with respect to its application for pick-and-place applications, it is understood that the system could be implemented in any setting where a robotic gripper may be useful, such as in various stages in a supply chain, assembly line, manufacturing environment, storage and warehouse facility, sorting stations, laboratory, and retail and commercial settings.

Figure 1:
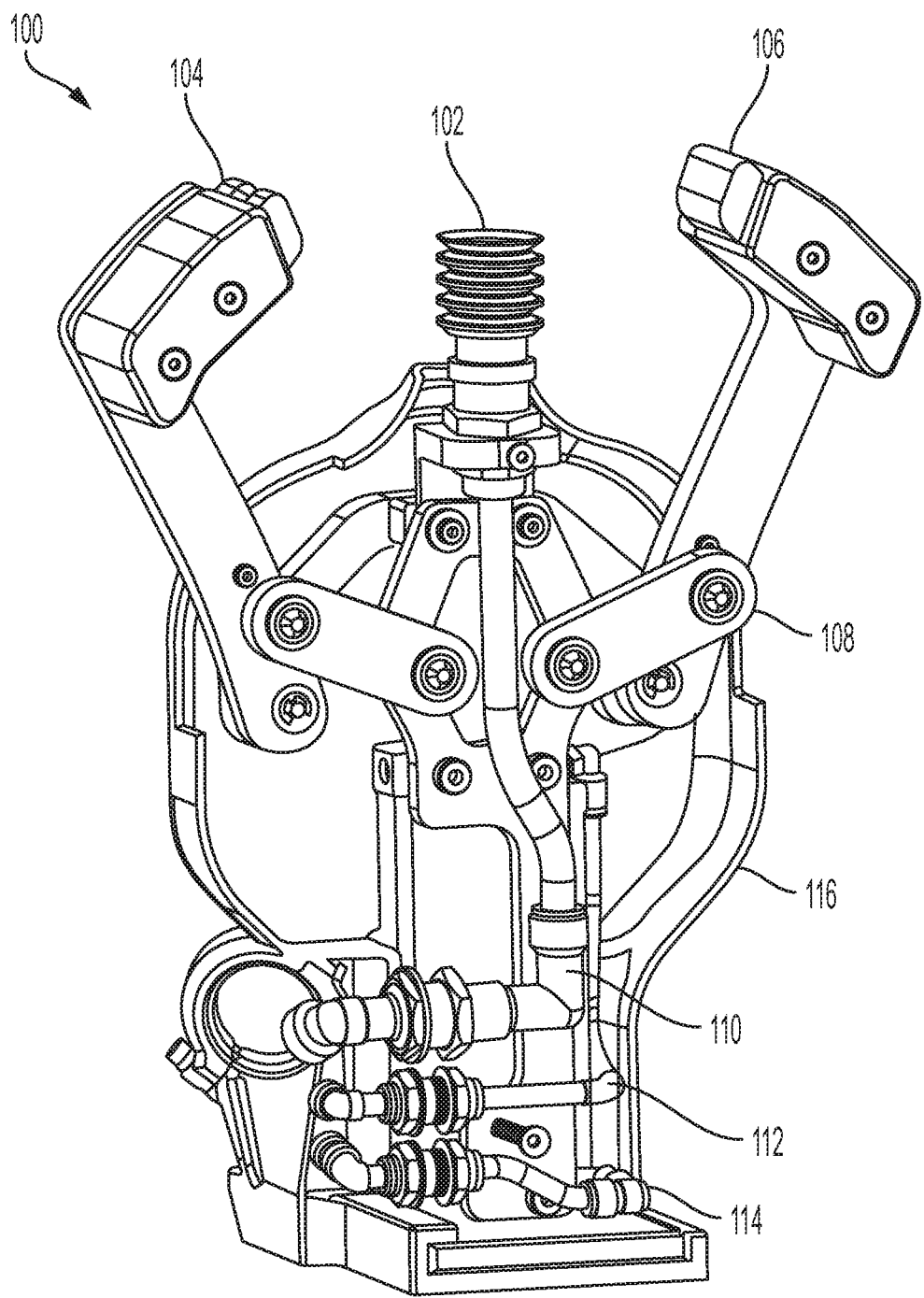
FIG. 1 is a perspective view of a robotic gripper according to an embodiment of the present disclosure.

FIG. 1 is a rear perspective view of a robotic gripper or apparatus according to an embodiment of the present disclosure. The robotic gripper 100 includes a suction gripper 102 (also referred to herein as a vacuum port), gripping fingers 104, 106, mechanical linkage 108, suction gripper supply line 110, finger supply line 112, actuator supply line 114, and front cover 116.

Figure 2:
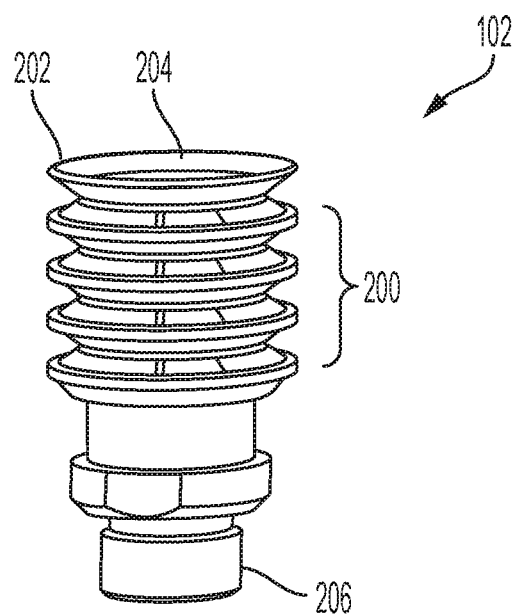
FIG. 2 is a perspective view of a suction gripper according to an embodiment of the present disclosure.

FIG. 2 is a perspective view of a suction gripper according to an embodiment of the present disclosure. The suction gripper 102 can include bellows 200 that allow the suction gripper 102 to be flexible, compressible, and/or extendable. The bellows 200 can be rigid, semi-rigid, or compliant. In an embodiment, the bellows 200 are formed from a deformable material, such as an elastomer, rubber, polymer, plastic, foam, sponge, or other material or structure that provides sufficient elasticity. In another embodiment, the suction gripper 102 can be formed from coils or metallic springs.

The suction gripper 102 includes a lip 202, and a base 206. The lip 202 is formed on a distal end of the suction gripper 102 that forms an opening 204 for vacuum suction. As pressure is applied to the lip 202 during contact with an external object (not shown), vacuum suction is provided via the opening 204, allowing the suction gripper 102 to grasp the external object about the lip 202. In an embodiment, the lip 202 can be smooth, textured, perforated, or coated with, or formed from, another material having a different durometer than the bellows 200 or the body of the suction gripper 102. In an embodiment, the lip 202 includes a compliant padding, fabric or felt material, and/or a tacky surface to provide adhesion properties.

The base 206 is configured to mate with a receptacle on the robotic gripper 100. In an embodiment, the base 206 allows for different suction types of suction grippers to be interchangeably utilized. For example, suction grippers with differing properties, sizes, lengths, thicknesses, diameters, and/or bellows spacing can be used with the robotic gripper 100. The base 206 also allows the suction gripper 102 to be removed for storage, maintenance, repair, cleaning, or replacement.

In an embodiment, the suction gripper 102 can include a plug or stopper (not shown) that can be placed within the opening 124 when the robotic gripper 100 is not in use, wherein the plug or stopper can be made from a cork, artificial cork, rubber, plastic, and the like. In another embodiment, the opening 124 can include a cap, cover, lid, one-way door, an adjustable aperture (such as in an optical assembly) and the like.

Figure 3:
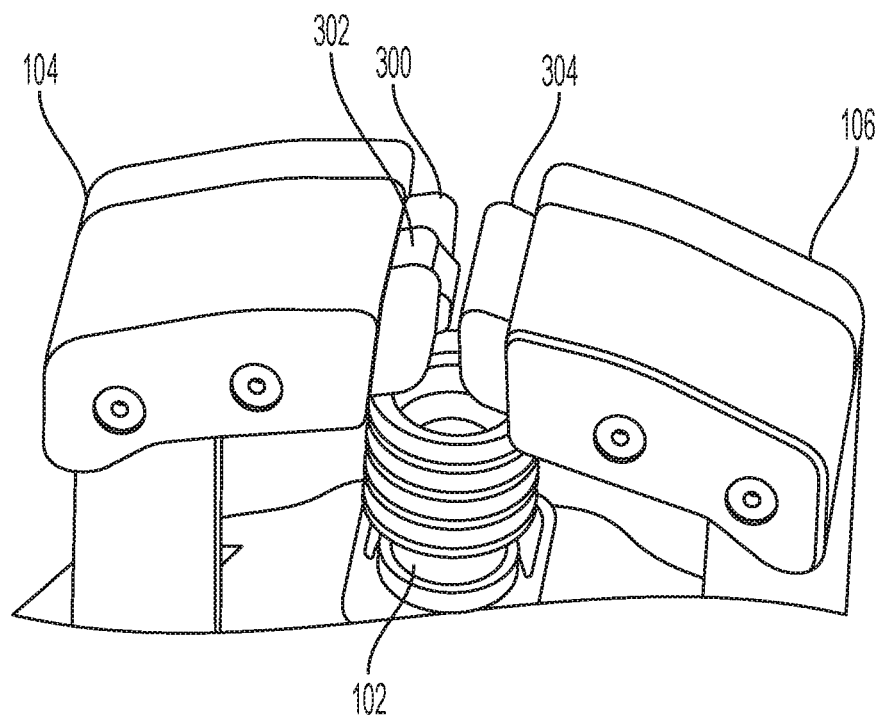
FIG. 3 is a perspective view of gripping fingers according to an embodiment of the present disclosure.

FIG. 3 is a perspective view of gripping fingers according to an embodiment of the present disclosure. In an embodiment, the gripping fingers 104, 106 are positioned on opposite locations about a perimeter around the suction gripper 102. Proximal gripping finger 104 can include pads 300 as well as a conductive pad 302. The pads 300 and conductive pad 302 can be compliant, semi-compliant, rigid, or semi-rigid. Distal gripping finger 106 can include a conductive pad 304. When the conductive pad 302 contacts the conductive pad 304, an electrical circuit is closed, thereby generating a contact signal. Thus, the conductive pads 302 and 304 together form a contact sensor. As will be described in more detail below, the robotic gripper 100, as well as the suction gripper 102 and gripping fingers 104, 106 can be controlled accordingly based on the contact signal. In an embodiment, the conductive pad 302 and conductive pad 304 can be formed from a compliant material that includes conductive properties, or which includes a conductive portion or area.

In an embodiment, the pads 300 and/or conductive pad 302, as well as pad 304, function as contact sensors, and can include embedded or integrated coils that function as a differential transformer. In another embodiment, the pads 300, 302, and 304 can include an internal ruler, scale, transducer, pressure sensor, or integrated circuit that can detect a contact.

In another embodiment, the gripping fingers 104, 106 can include opposing magnets or electromagnets that create an electrical circuit when contacted with one another. In yet another embodiment, the gripping fingers 104, 106 can include an optical transmitter and receiver which can open or close an electrical circuit based on an object or obstacle in the path of light between the transmitter and receiver. This embodiment can also utilize distance sensing based on optical measurements to determine the spacing between the two gripping fingers 104, 106.

Figure 4:
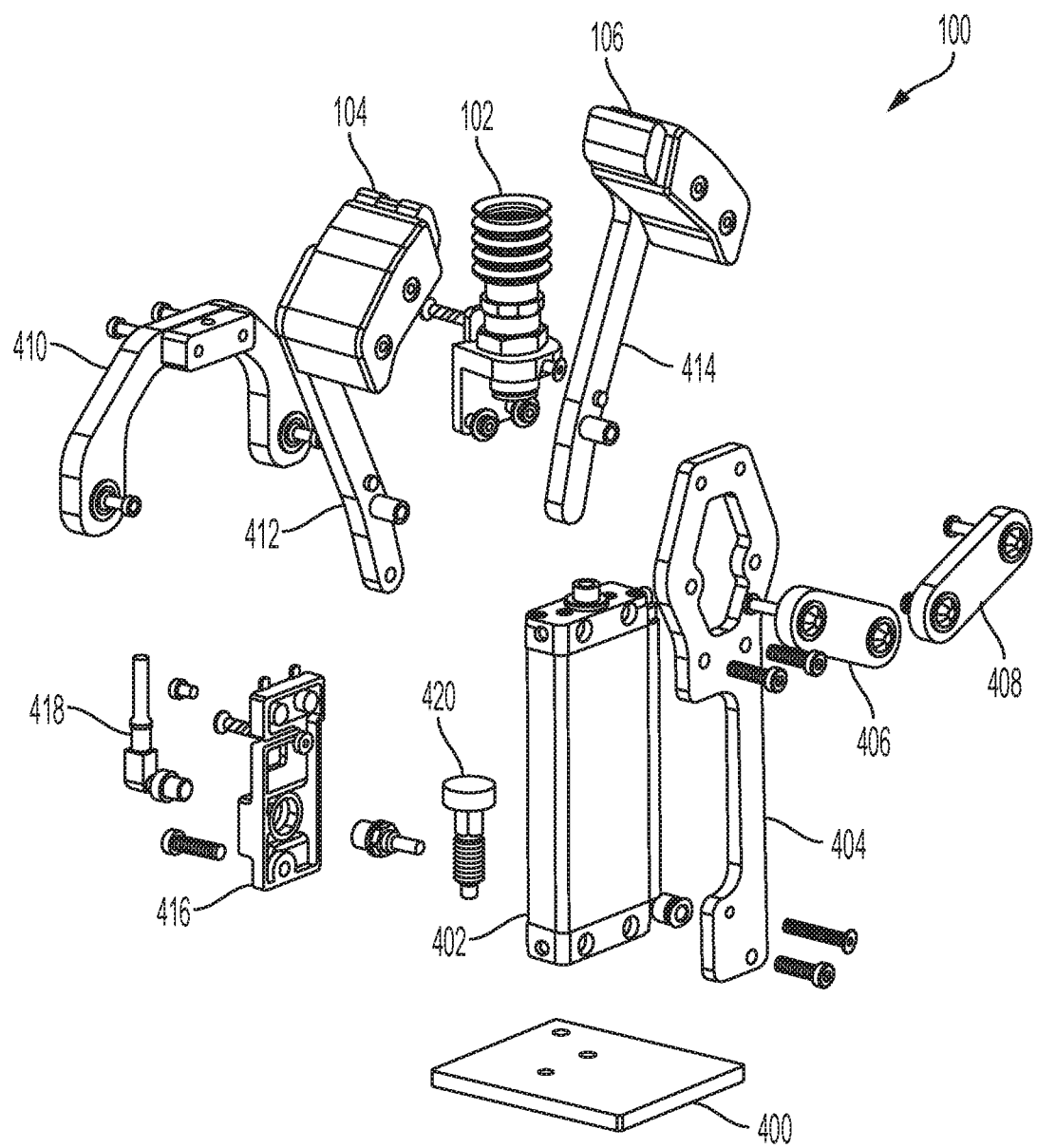
FIG. 4 is an exploded view of the robotic gripper according to an embodiment of the present disclosure.

FIG. 4 is an exploded view of the robotic gripper 100 according to an embodiment of the present disclosure. The robotic gripper 100 includes a mounting plate 400, such as a Festo® adapter plate, an actuator 402, a palm plate 404, rotating drive linkages 406, 408, linear drive linkage 410, proximal linkage 412, distal linkage 414, electronics connector port 416, electrical wire guide 418, and plunger 420.

In another embodiment, the robotic gripper 100 does not include a linear drive linkage 410 or palm plate 404, and the proximal linkage 412 and distal linkage 414 are not mechanically or physically coupled. In this embodiment, each linkage 412, 414 can include independent swivel or pivot structures (not shown) that allow each linkage 412, 414 to rotate about a vertical axis of the suction gripper 102. Such rotation allows each linkage 412, 414 to independently move to a position about a circular arc formed around the vertical axis of the suction gripper 102, effectively allowing each linkage 412, 414 to move closer to, or farther apart, from one another. Such rotation further allows the robotic gripper 100 to dynamically adapt in order to reach a narrow area or surface where the suction gripper 102 normally would not be able to reach due to a risk of collision of objects with the linkages 412, 414 and/or gripping fingers 104, 106.

In yet another embodiment, each linkage 412, 414 can include independent swivel or pivot structures (not shown) that allow each linkage 412, 414 to raise or lower vertically about a horizontal axis of the suction gripper 102, or about a horizontal plane relative to the mounting plate 400. Such motion allows each linkage 412, 414 to independently widen or narrow the potential contact area of the robotic gripper 102.

Figure 5:
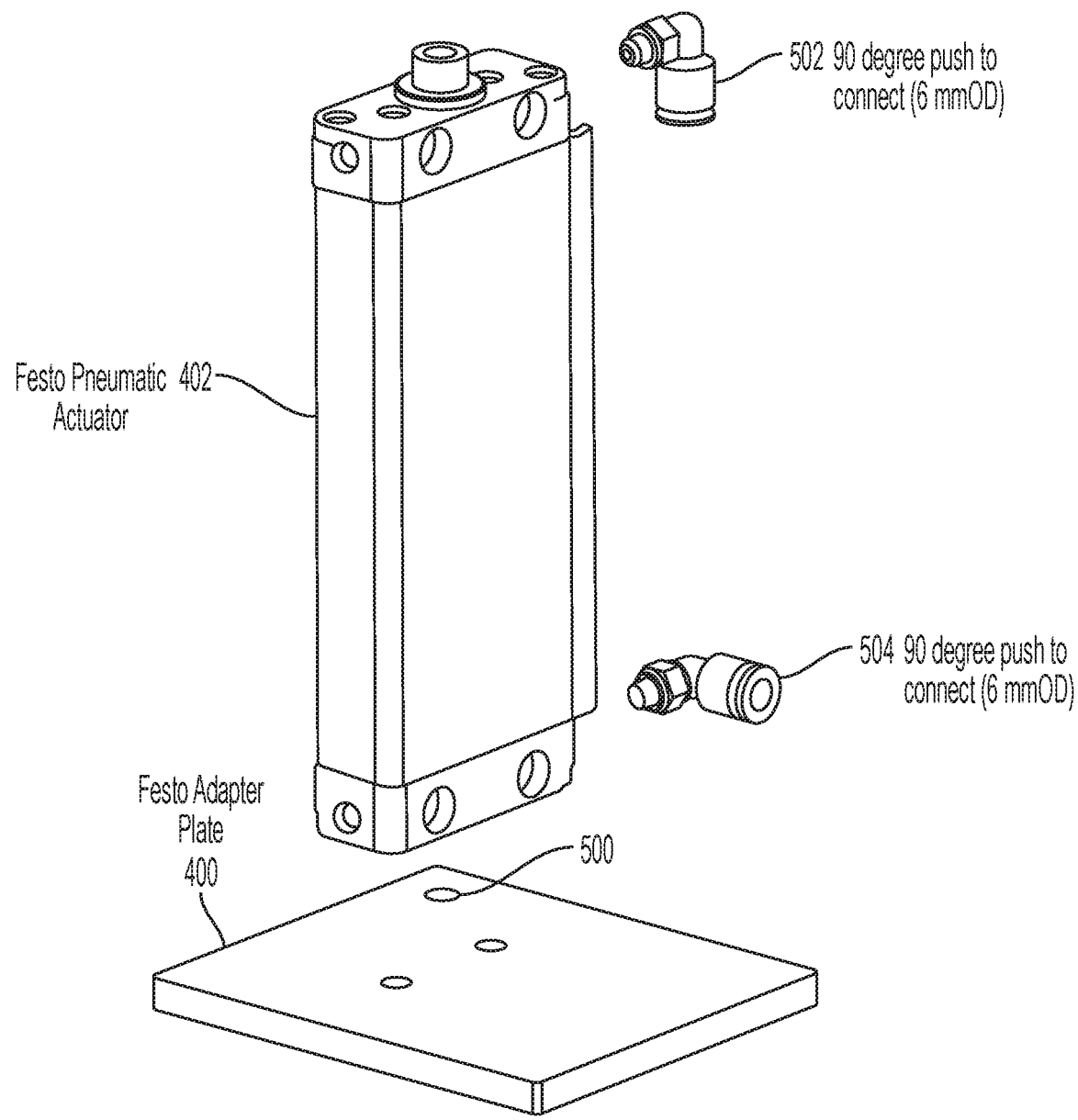
FIG. 5 is an exploded perspective view of the actuator assembly according to an embodiment of the present disclosure.

FIG. 5 is an exploded perspective view of the actuator assembly 402 according to an embodiment of the present disclosure. In at least one embodiment, the actuator 402 is a pneumatic actuator that can be secured to the mounting plate 400 with any known methods, such as via bolts, screws, clips, male/female connectors, and the like. In an embodiment, the mounting plate 400 includes openings 500 which allow for bolts (not shown) to be inserted to affix the mounting plate 400 to the actuator 402. The actuator 402 further includes connectors 502, 504 for coupling supply lines to the robotic gripper 100. The connectors 502, 504 can be various types of fittings, such as, for example, quick connect, push-to-pull, push-to-connect, push-in, push-fit, or instant fittings that can be easily attached and/or removed without the use of tools, and which allow air, gas, water, oil, viscoelastic fluid, and/or liquid supply lines to be attached. In an embodiment, the connectors 502, 504 can be right angle, 90 degree, elbow, or straight connectors. In another embodiment, the connectors 502, 504 can have any degree of curvature, and each connector 502, 504 can have a different shape or degree of curvature.

In another embodiment, the connectors 502, 504 can be permanently affixed to the actuator 402, or integrally built into the actuator 402 via molding, for example.

The connectors 502, 504 can be universal connectors that allow supply lines of various sizes and dimensions to be affixed. In an embodiment, the connectors 502, 504 have an outer diameter of between 1 mm and 200 mm, and in a preferred embodiment, have an outer diameter of 6 mm.

In another embodiment, the actuator 402 can be a motorized actuator, electric/battery-operated actuator, mechanical actuator, or hydraulic actuator (none of which are shown). In yet another embodiment, the robotic gripper 100 can include multiple actuators, such as a primary actuator, and a backup actuator which is configured to operate in the event a primary actuator fails. The primary and backup actuators can both be of the same type (i.e., pneumatic), or alternatively, the primary and backup actuators can be of different types (i.e., one is pneumatic and the other is electrical/battery-operated).

Figure 6:
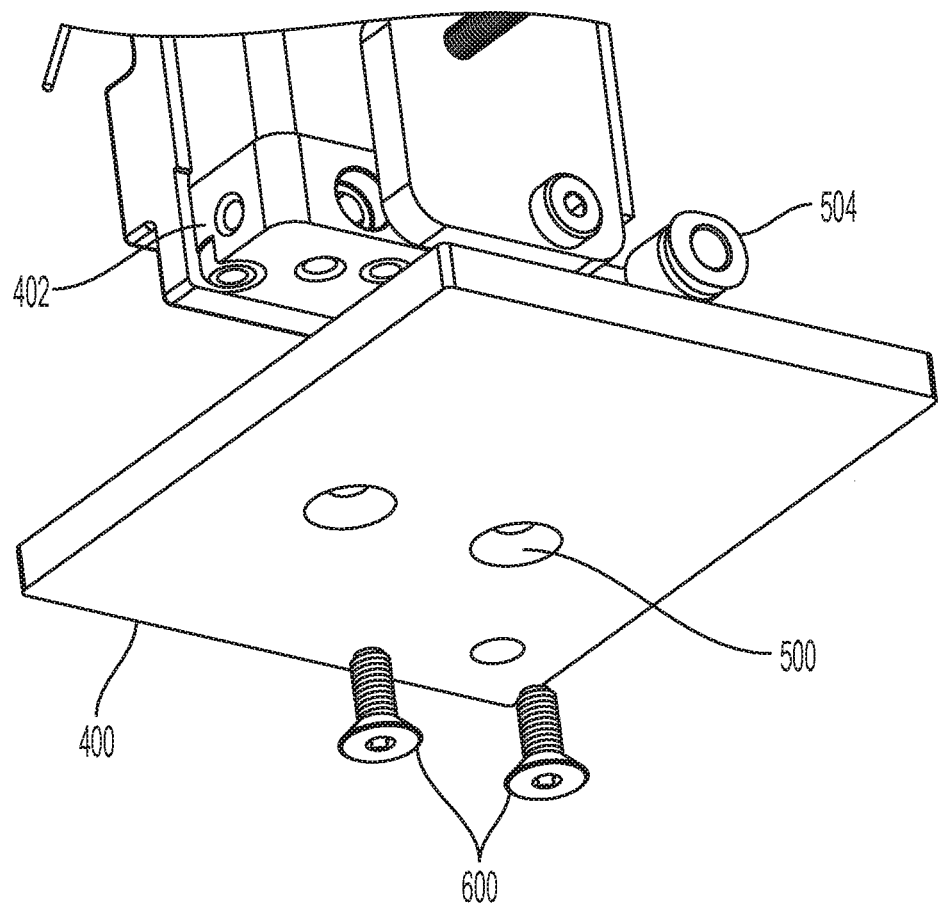
FIG. 6 is an exploded bottom view of the actuator assembly according to an embodiment of the present disclosure.

FIG. 6 is an exploded bottom view of the actuator assembly 402 according to an embodiment of the present disclosure. As discussed above, the actuator 402 can be affixed to the mounting plate 400 via bolts 600 inserted through the openings 500. The actuator 402 can be secured to the mounting plate 400 with any known methods, such as via bolts, screws, clips, male/female connectors, and the like.

Figure 7:
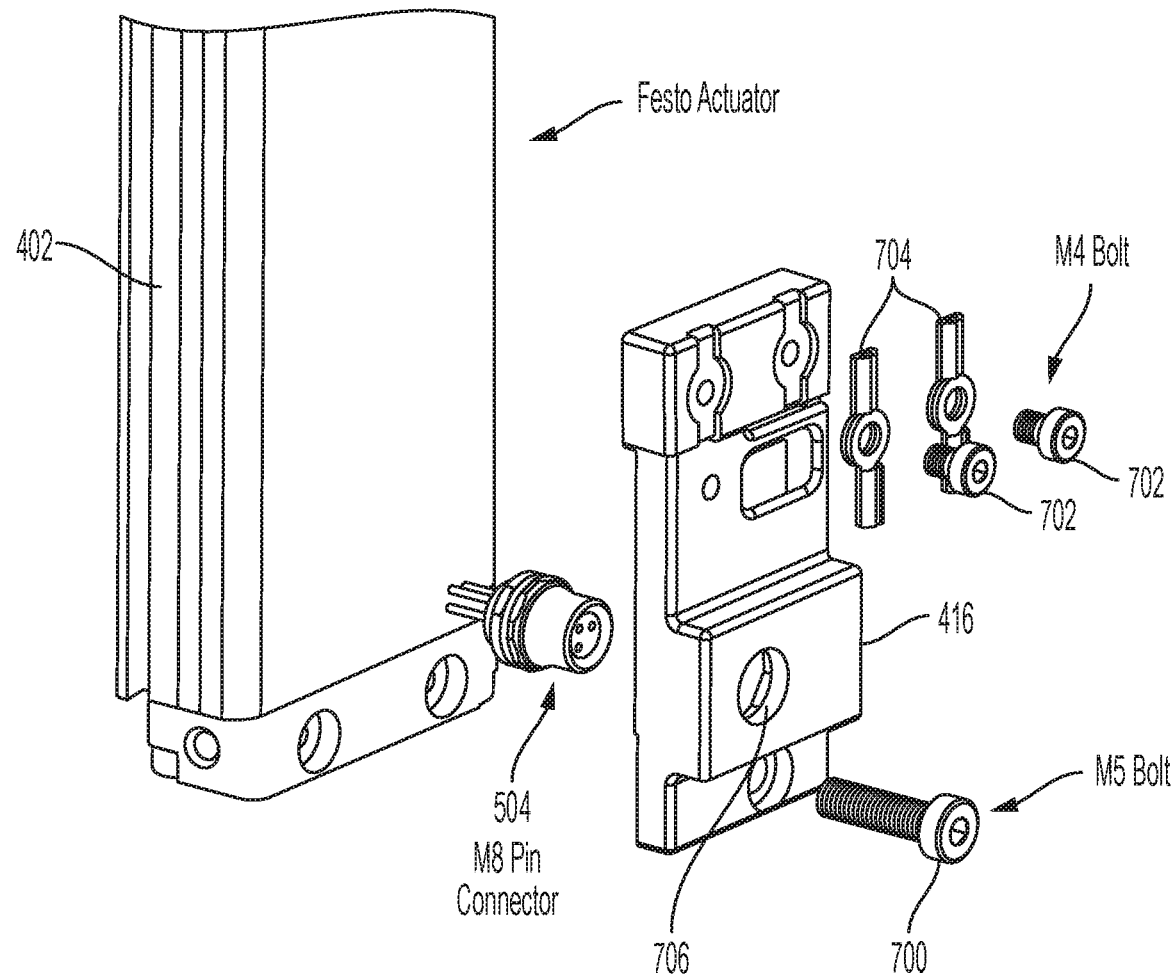
FIG. 7 is an exploded via of an electronics connector port mounting assembly according to an embodiment of the present disclosure.

FIG. 7 is an exploded via of an electronics connector port mounting assembly according to an embodiment of the present disclosure. The electronics connector port 416 is affixed to the actuator 402 via bolt 700 at a lower portion, and via bolts 702 with sandwiched ring terminals 704. Connector 504 is inserted through opening 706 in the electronics connector port 416. The electronics connector port 416 can be secured to the actuator 402 with any known methods, such as via bolts, screws, clips, male/female connectors, and the like.

Figure 8:
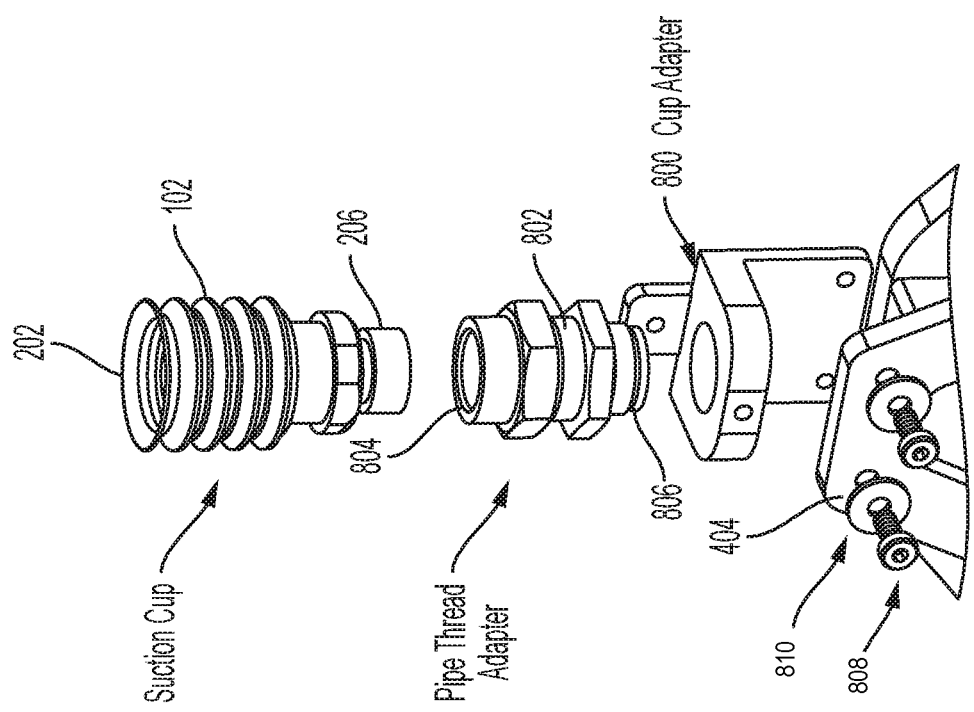
FIG. 8 is an exploded via of a suction cup mounting assembly according to an embodiment of the present disclosure.

FIG. 8 is an exploded via of a suction gripper mounting assembly according to an embodiment of the present disclosure. In an embodiment, the suction gripper 102 is in the form of a cup, such as those manufactured by Piab AB®. The suction gripper 102 can take various forms and shapes, such as, but not limited to, flat, flat concave, bellows, multi-bellows, deep, deep concave, universal, oval bellows, oval flat, oval concave, rectangular bellows, foam, and the like. In an embodiment, the suction gripper 102 can have a lip 202 and/or body with various properties, such as, but not limited to, a friction surface, made from an FDA approved material (i.e., FDA 21 CFR 177.2600), a transparent material, a colored or pigmented material, thin lips, thick lips, concave lips, convex lips, customized friction patterns, short bellows, long bellows, high wear resistant material, temperature and weather resistant material, a mark-free material, an antimicrobial or antibacterial coating or material, suitable for gripping hot or cold temperature surfaces, and/or suitable for gripping wet or viscous surfaces. The suction gripper 102 can further be configured based on the robotic gripper 100 application, such as, for example, handling oily sheet metal, handling dry sheet metal, bag handling, bag opening, thin paper/sheet handling, cardboard/corrugated board handling, food contact and handling, glass handling, electronics and semiconductor handling, biological and laboratory equipment handling, high/low temperature environments, mark free handling, and the like.

Figure 9:
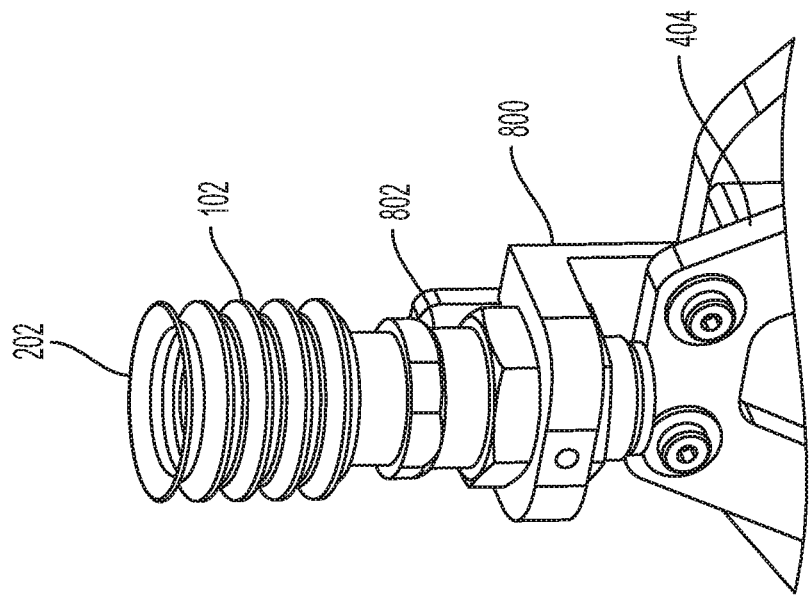
FIG. 9 is a perspective view of a suction gripper mounting assembly according to an embodiment of the present disclosure.

The suction gripper 102 is mounted to the palm plate 404 via a cup adapter 800. The base 206 of the suction gripper 102 is configured to mate with a top end 804 of a thread adapter 802. A bottom end 806 of the thread adapter 802 is configured to mate with an opening in the cup adapter 800, as shown in FIGS. 8 and 9. In an embodiment, the cup adapter 800 is secured to the palm plate 404 via bolts 808 with sandwiched washers 810. The cup adapter 800 can be secured to the palm plate 404 with any known methods, such as via bolts, screws, clips, male/female connectors, and the like.

Figure 10:
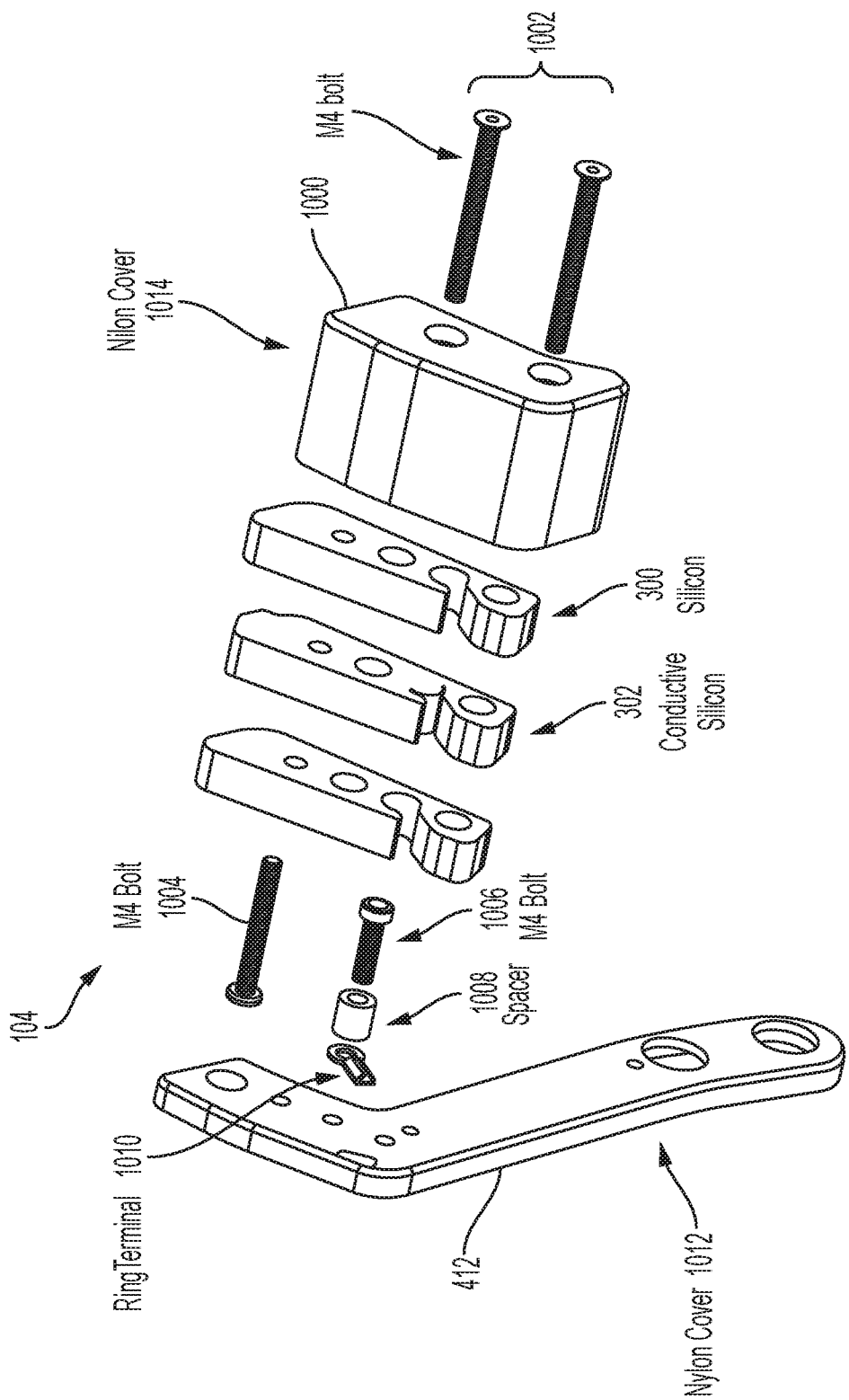
FIG. 10 is an exploded via of a proximal gripping finger assembly according to an embodiment of the present disclosure.

FIG. 10 is an exploded view of a proximal gripping finger assembly according to an embodiment of the present disclosure. The proximal gripping finger 104 is attached to the proximal linkage 412 which is sandwiched between, and coupled to, rotating drive linkage 406 and linear drive linkage 410, as shown in FIG. 4. The proximal gripping finger 104 is composed of conductive pad 302 placed between pads 300. In an embodiment, the conductive pad 302 and pads 300 are formed from a conductive silicone and a silicone, respectively. In an embodiment, the pads 300 can be formed from an elastomer, rubber, polymer, plastic, foam, sponge, or other material or structure that provides sufficient elasticity.

In an embodiment, the conductive pad 302 can be formed from a conductive elastomer such as multicon, radthin, or any of the following materials impregnated with metal, wire mesh, or conductive materials: an elastomer, rubber, polymer, plastic, foam, sponge, or other material or structure that provides sufficient elasticity. In yet another embodiment, the conductive pad 302 is formed form a metal or alloy.

The pads 300 and conductive pad 302 assembly are covered with a cover 1000, which can be made from nylon or any type of elastomer, plastic, rubber, and the like. In an embodiment, the cover 1000 is made from a non-conductive material. Bolts 1002 are used secure the cover 1000 to the conductive pads 300 and conductive pad 302, as well as to the proximal linkage 412, as shown in FIG. 10. Bolt 1004 is further used to secure the pads 300 and conductive pad 302 to the proximal linkage 412. Bolt 1006 is used to secure a ring terminal 1010 to the proximal linkage 412. In an embodiment, a spacer 1008 is sandwiched between the ring terminal 1010 and the head of bolt 1006. In an embodiment, the spacer 1008 is made from a non-conductive material. The cover 1000, pads 300 and conductive pad 302 can be secured to proximal linkage 412 with any known methods, such as via bolts, screws, clips, male/female connectors, and the like.

In an embodiment, the proximal linkage 412 includes a cover (not labelled) formed from nylon or any type of elastomer, plastic, rubber, and the like. In an embodiment, the proximal linkage 412 cover is made from a non-conductive material.

In another embodiment, the pads 300 and conductive pad 302 are secured to each other by bonding, such as via adhesive, resin, epoxy, or a hot-melt process. In yet another embodiment, the pads 300 and conductive pad 302 are integrally formed from a non-conductive material, where the central portion representing the conductive pad 302 is impregnated with a conductive material, or where a conductive material is added to the outer surface of the conductive pad 302. In another embodiment, conductive pad 302 is formed form a metal or alloy.

Figure 11:
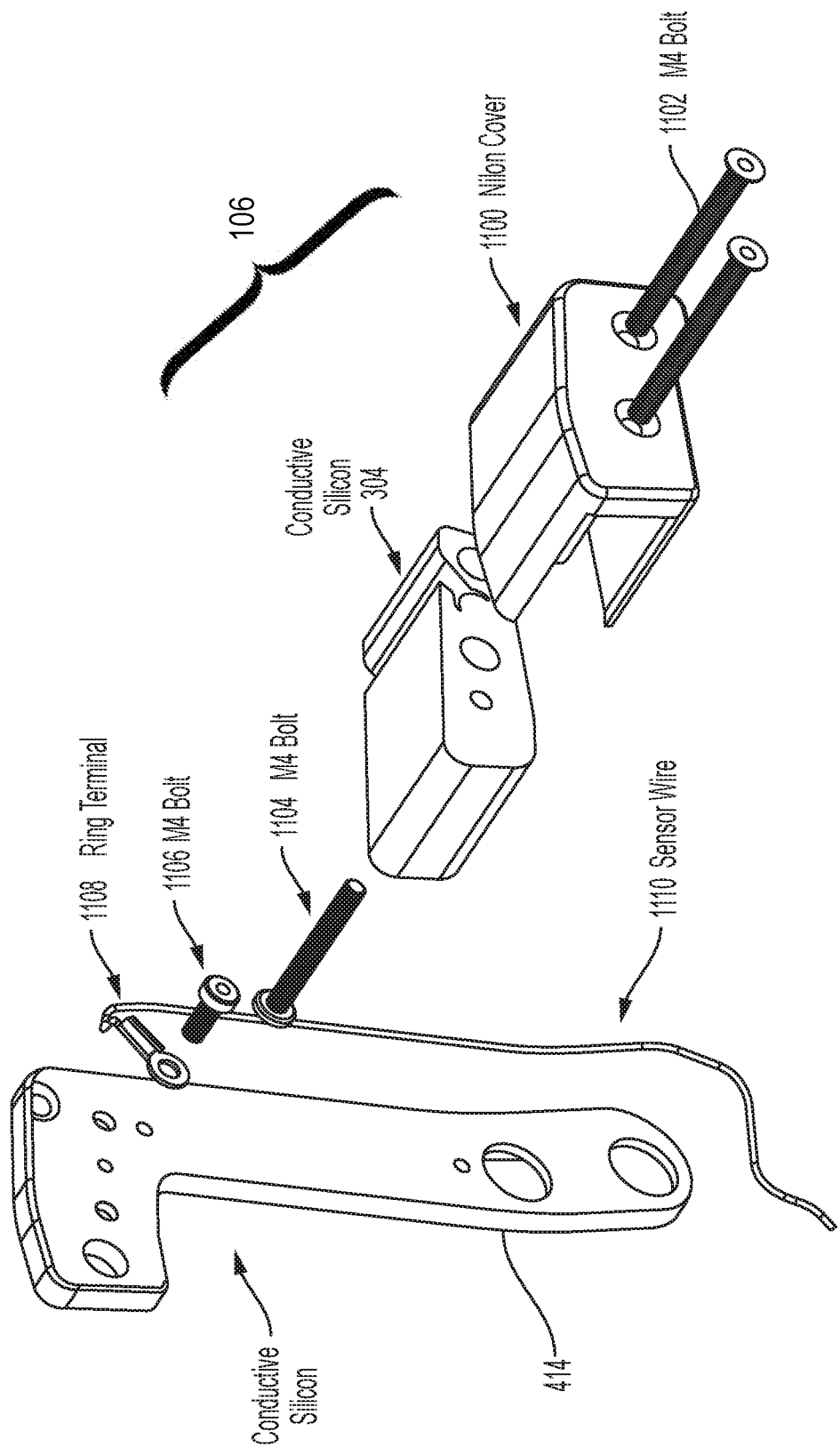
FIG. 11 is an exploded via of a distal gripping finger assembly according to an embodiment of the present disclosure.

FIG. 11 is an exploded via of a distal gripping finger assembly according to an embodiment of the present disclosure. The distal gripping finger 106 is attached to the distal linkage 414 which is sandwiched between, and coupled to, rotating drive linkage 406 and linear drive linkage 410, as shown in FIG. 4. The distal gripping finger 106 is composed of conductive pad 304. In an embodiment, the conductive pad 304 is formed from a conductive silicone.

In an embodiment, the conductive pad 304 can be formed from a conductive elastomer such as multicon, radthin, or any of the following materials impregnated with metal, wire mesh, or conductive materials: an elastomer, rubber, polymer, plastic, foam, sponge, or other material or structure that provides sufficient elasticity. In yet another embodiment, the conductive pad 304 is formed form a metal or alloy, such that the distal gripping finger 106 consists of a metal core conductive pad surrounded by a nylon or non-conductive cover.

The conductive pad 304 is covered with a cover 1100, which can be made from nylon or any type of elastomer, plastic, rubber, and the like. In an embodiment, the cover 1100 is made from a non-conductive material. Bolts 1102 are used secure the cover 1100 to the conductive pad 304, as well as to the distal linkage 414, as shown in FIG. 11. Bolt 1104 is further used to conductive pad 304 to the distal linkage 414. Bolt 1106 is used to secure a ring terminal 1108 to the distal linkage 414. The cover 1100, conductive pad 304 can be secured to distal linkage 414 with any known methods, such as via bolts, screws, clips, male/female connectors, and the like.

The ring terminal 1108 is coupled to an electrical wire 1110. The electrical wire 1110 is coupled to a ring terminal 704 on the electronics connector port 416 on its opposite end, as shown in FIG. 7. In an embodiment, ring terminal 1010 coupled to the proximal gripping finger 104 also includes an electrical wire that is coupled to a ring terminal 704. The electrical wire(s) are used to communicate data, such as control, position, orientation, and/or pressure information, and the like, between the electronics connector port 416 and sensors and/or motors located on the proximal gripping finger 104 and/or the distal gripping finger 106, as well as on the proximal linkage 412 and/or the distal linkage 414.

In an embodiment, the proximal gripping finger 104 and/or distal gripping finger 106, as well as the proximal linkage 412 and/or the distal linkage 414, can include various sensors, such as, but not limited to, electrical continuity sensors, pressure transducers, gyroscopes, accelerometers, altimeters, accelerometers, rotational sensors, temperature sensors, optical sensors, imaging and vision systems, microwave sensors, infrared sensors, ultrasonic sensors, vibration sensors, acoustic sensors, and the like.

In yet another embodiment, proximal gripping finger 104 and/or distal gripping finger 106 includes a wireless transceiver (not shown) which communicates wirelessly with a transceiver located on, for example, the electronics connector port 416 (not shown). In this embodiment, the electrical wire(s) are replaced with wireless transceivers. In yet another embodiment, the robotic gripper 100 includes both electrical wire(s) and wireless transceivers.

Figure 12:
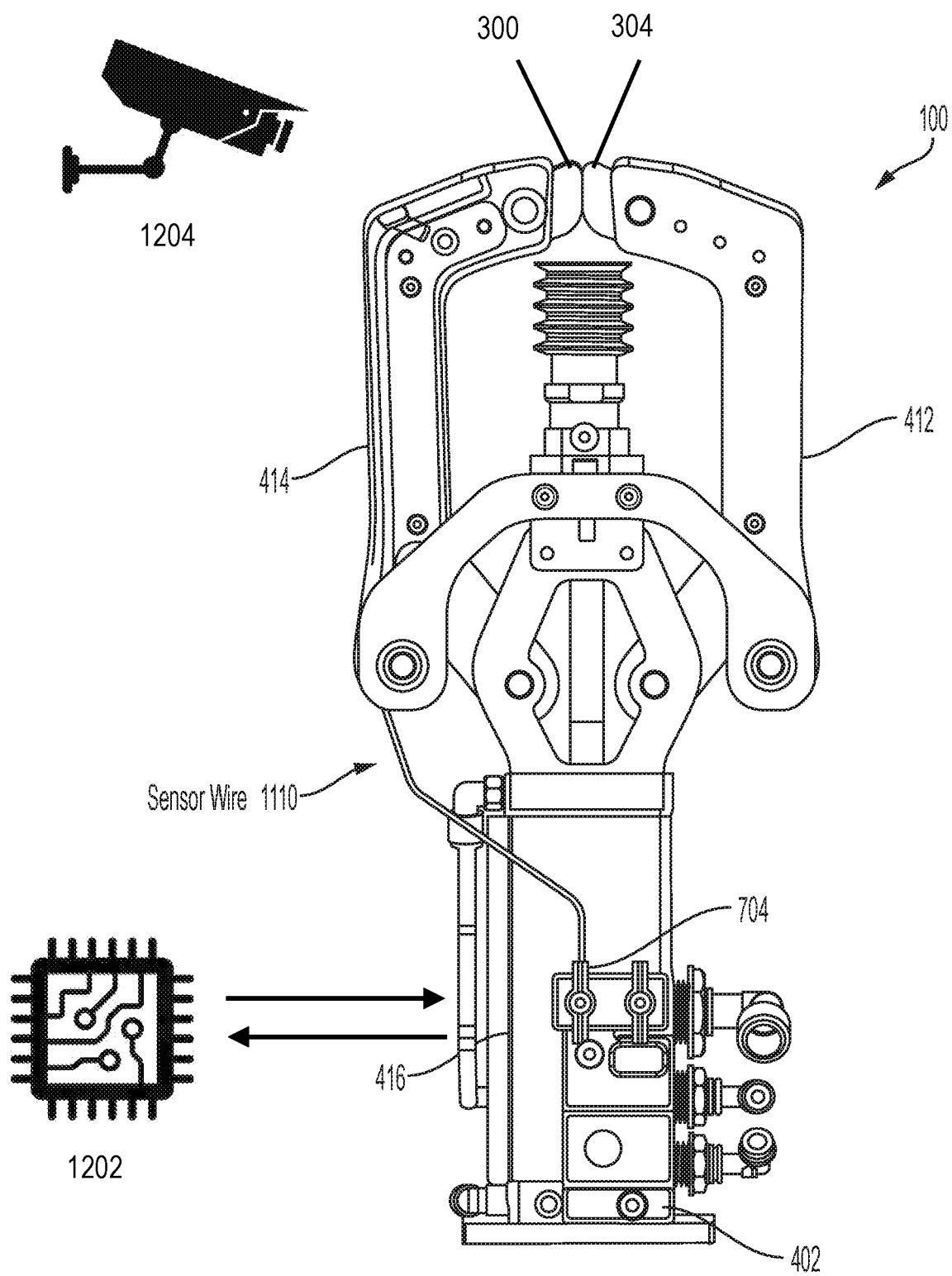
FIG. 12 is a rear view of a robotic gripper according to an embodiment of the present disclosure.

FIG. 12 is a rear view of the robotic gripper 100 according to an embodiment of the present disclosure. In an embodiment, the robotic gripper 100 includes the electrical wire 1110 that is coupled at one end to the distal linkage 414 and coupled to the ring terminal 704 on the electronics connector port 416. As discussed above, the electrical wire 1110 can alternatively be coupled to the proximal linkage 412 instead of the distal linkage 414, or another electrical wire (not shown) can be coupled between the proximal linkage 412 and the electronics connector port 416.

In addition, the electronics connector port 416 is communicatively coupled to a controller 1202 via a hard wired connection or a wireless connection. The pads 300, 302, and/or 304 acting as, or integrated with, contact sensors can also include wireless transceivers which can communicate with the controller 1202. In addition, a camera 1204 can also be communicatively coupled to the controller 1202 via a hard wired connection or wireless connection.

The controller 1202 can be located remotely from the robotic gripper 100, or alternatively, can be physically coupled to or integrated with the robotic gripper 100. In another embodiment, the controller 1202 can be cloud based or operating on a distributed server network.

In another embodiment, a wireless transceiver (not shown) can be coupled to the electronics connector port 416, and another wireless transceiver(s) (not shown) can be coupled to the distal linkage 414, the proximal linkage 412, rotating drive linkages 406, 408, linear drive linkage 410, palm plate 404, and/or any other portion of the robotic gripper 100. The wireless transceivers can utilize various forms of wireless communication technology, such as Bluetooth, Bluetooth Low Energy, infrared, RFID, Zigbee, cellular, wi-fi, or any other type of short- or long-range communication. In yet another embodiment, at least one of the wireless transceivers can be located remotely from the robotic gripper 100, such as at a remote control station. In yet another embodiment, the robotic gripper 100 can bi-directionally communication with a remote control station via web-based or cloud computing technology.

Figure 13:
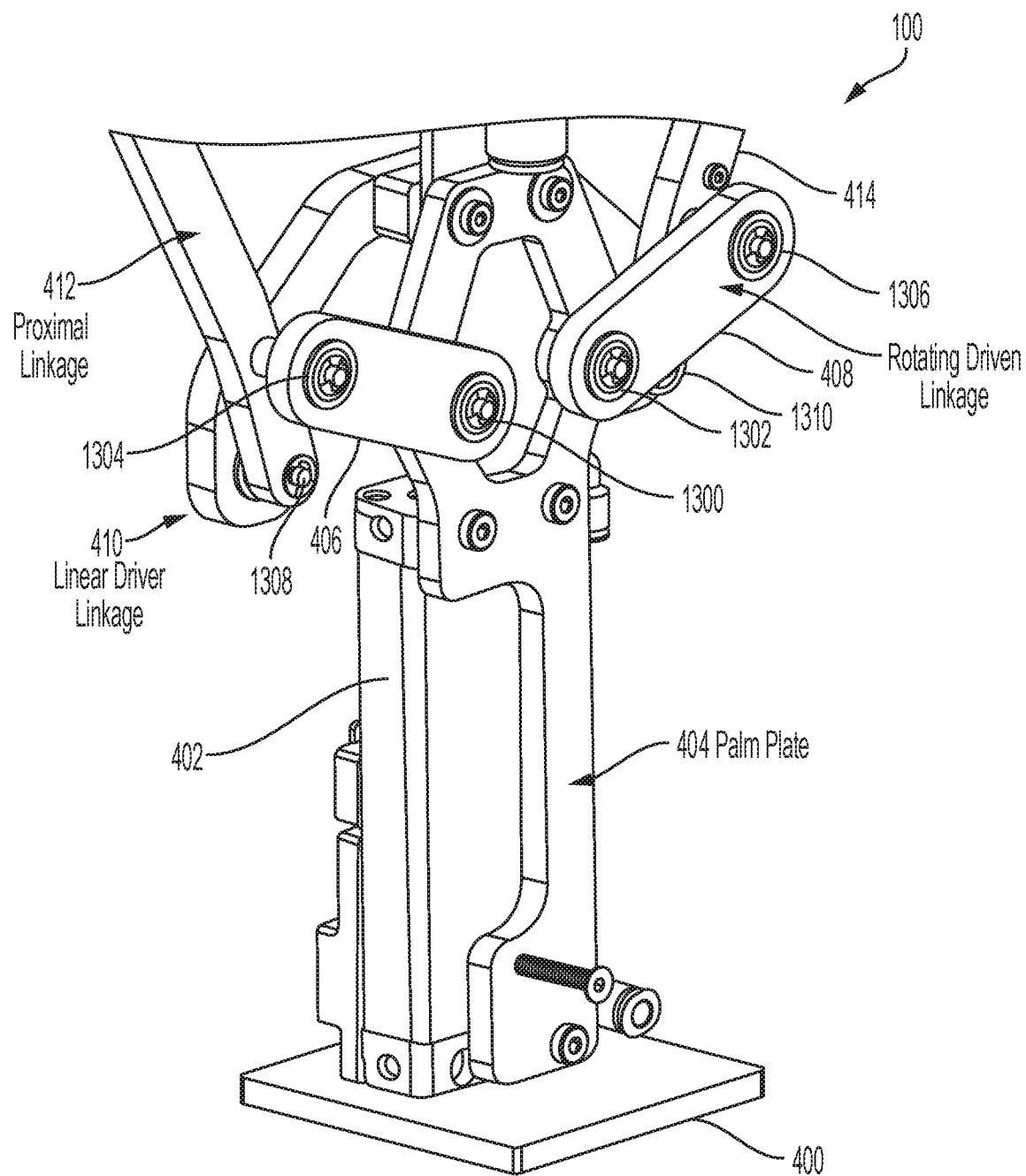
FIG. 13 is a perspective view of a linkage structure assembly according to an embodiment of the present disclosure.

FIG. 13 is a perspective view of a linkage structure assembly according to an embodiment of the present disclosure. The robotic gripper 100 is coupled to mounting plate 400. The actuator 402 is secured to the mounting plate 400, and the palm plate 404 is coupled to the actuator 402. Rotating drive linkages 406, 408 are rotatably mounted to the palm plate 404 via bolts 1300, 1302, respectively. The proximal linkage 412 is rotatably mounted between the rotating drive linkage 406 via bolt 1304 and the linear drive linkage 410 via bolt 1308. The distal linkage 414 is rotatably mounted between the rotating drive linkage 408 via bolt 1306 and the linear drive linkage 410 via bolt 1310 (partially shown in FIG. 13). In an embodiment, the bolts 1300, 1302, 1304, 1306, 1308, and 1310 can be bolts, screws, clips, male/female connectors, and the like.

In an embodiment, the bolts 1300-1310 and/or rotating joints to which they are respectively coupled to can include various types of sensors, such as, but not limited to, rotational sensors, reflective sensors, rotary position encoders, magnetic sensors, and/or Hall-effect sensors. Such sensors can be configured to communicate via the electrical wire(s) and/or the wireless transceiver(s) discussed above.

Figure 14:
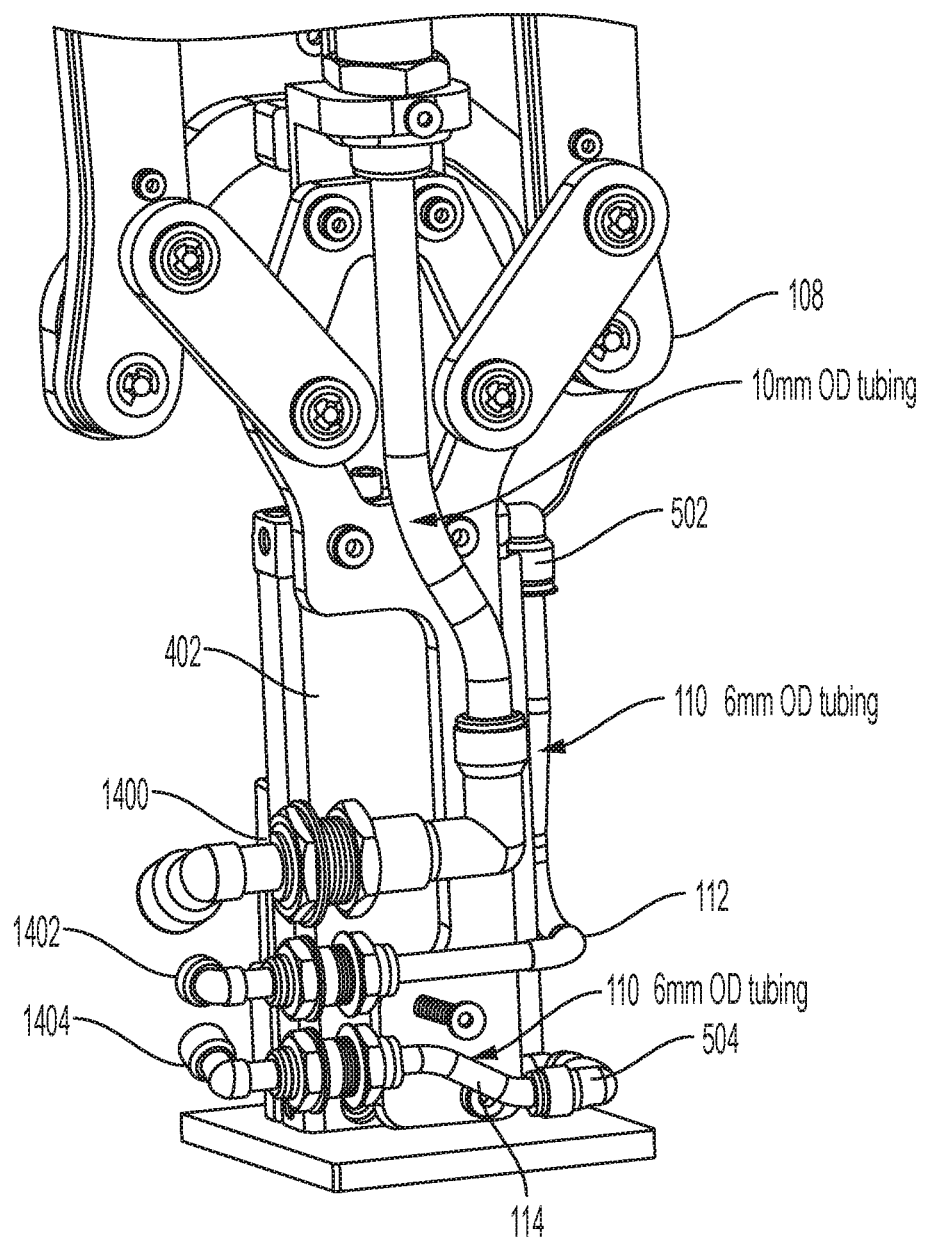
FIG. 14 is a perspective view of a pneumatic line assembly according to an embodiment of the present disclosure.

FIG. 14 is a perspective view of a pneumatic line assembly according to an embodiment of the present disclosure. In order to provide pneumatic pressure, via, for example, pressurized gas or air, to the mechanical linkage 108 and the suction gripper 102, the robotic gripper 100 includes various supply lines 110, 112, and 114. The suction gripper supply line 110 provides pressure to the suction gripper 102. The finger supply line 112 provides pressure to the mechanical linkage 108, which in turn drives movement of the gripping fingers 104, 106. The actuator supply line 114 provides pressure to the actuator 402. In another embodiment, the supply lines 110, 112, and 114 can provide hydraulic pressure, via, for example, pressurized water, oil, viscoelastic fluid, or any other suitable liquid.

In an embodiment, the connectors suction gripper supply line 110 has an outer diameter of between 1 mm and 200 mm, and in at least one embodiment, has an outer diameter of 10 mm. In an embodiment, the finger supply line 112 and the actuator supply line 114 have an outer diameter of between 1 mm and 200 mm, and in at least one embodiment, they have an outer diameter of 6 mm.

In an embodiment, the supply lines 110, 112, and 114 are coupled to an external pressure source that provides compressed a pneumatic or hydraulic medium, such as a pump, motor, generator, and the like. In another embodiment, the pressure source can be coupled to, or integral with, the robotic gripper 100. As shown in FIG. 14, the supply lines 110, 112, and 114 are coupled to a pressure source via connectors 1400, 1402, and 1404, respectively. The connectors 1400, 1402, and 1404 can be various types of fittings, such as, for example, quick connect, push-to-pull, push-to-connect, push-in, push-fit, or instant fittings that can be easily attached and/or removed without the use of tools, and which allows air, gas, water, oil, viscoelastic fluid, and/or liquid supply lines to be attached.

In an embodiment, the supply lines 110, 112, and 114 are made from an elastomer or plastic, such as, but not limited to, nylon, polyethylene, polypropylene, polyurethane, PVC, vinyl. In another embodiment, the supply lines 110, 112, and 114 are made from a metal or ally, such as, but not limited to, aluminum, copper, steel, stainless steel, a flexible metal, semi-rigid metal, or a rigid metal. The supply lines 110, 112, and 114 can be coated with, for example, polytetrafluoroethylene or any other type of coating that provides a low coefficient of friction, abrasion and wear resistance, and/or chemical resistance.

In yet another embodiment, the supply lines 110, 112, and 114 can serve as conduits for electrical lines (not shown) which provide electric power to motors (not shown) coupled to actuator 402, mechanical linkage 108, and/or suction gripper 102.

Figure 15:
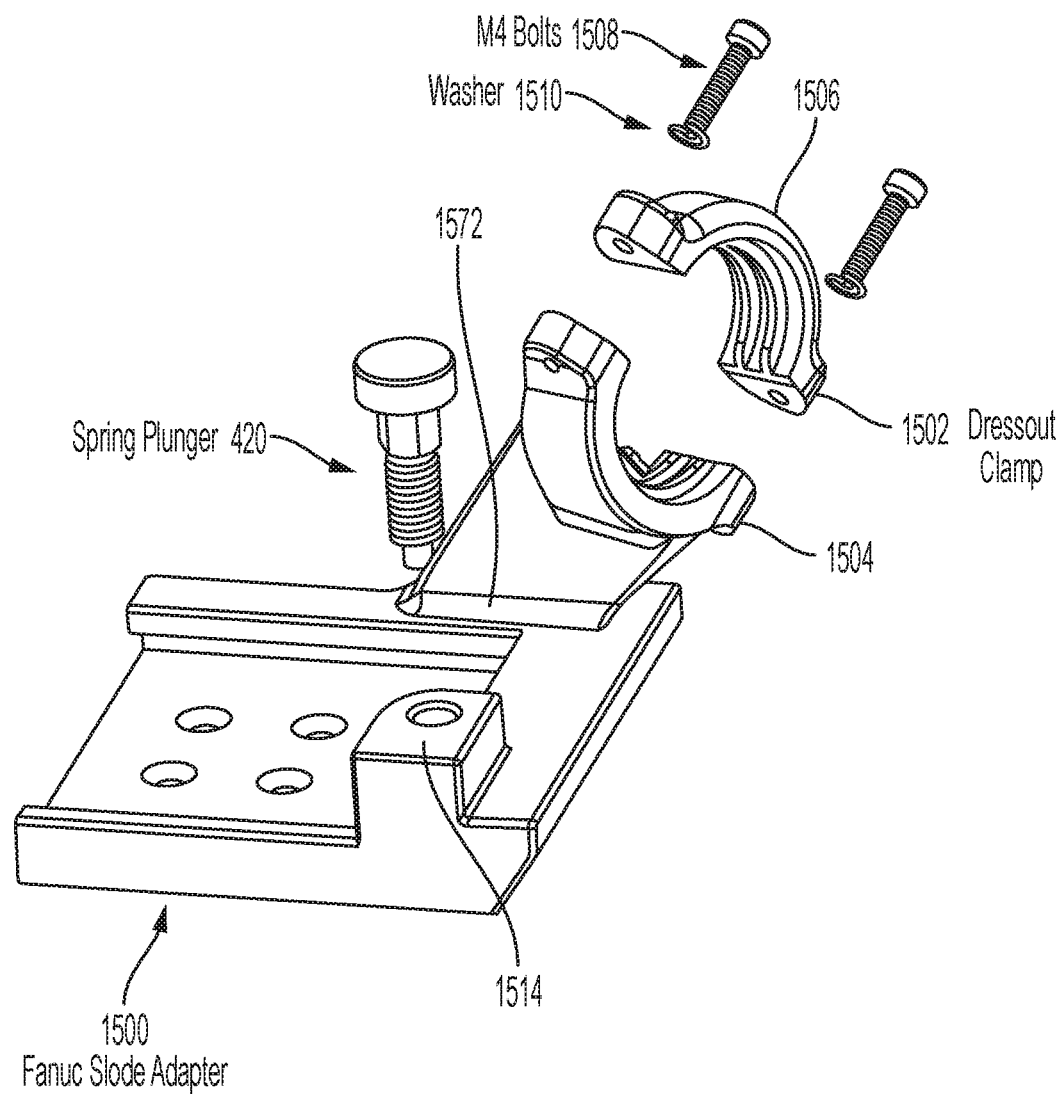
FIG. 15 is a perspective view of a quick connect mount for a robotic gripper according to an embodiment of the present disclosure.

FIG. 15 is a perspective view of a quick connect mount for a robotic gripper according to an embodiment of the present disclosure. In an embodiment, the robotic gripper 100 can be mounted to a quick connect mount 1500, which can be a slide adapter, press-fit adapter, male/female adapter, and the link which allows for a tool-less removal and attachment of the robotic gripper 100 to the quick connect mount 1500. The quick connect mount 1500 can be secured to a fixed or moving surface and allows the robotic gripper 100 to be removed for maintenance, repair, and parts exchange (i.e., exchanging various types of suction grippers, etc.). In addition, the quick connect mount 1500 can accept other robotic grippers, providing a universal mounting in the event another type of robotic gripper needs to be installed in an environment.

In an embodiment, the quick connect mount 1500 includes a dressout clamp 1502 which provides a secure harness for supply lines from a pressure source (not shown). The dressout clamp 1502 can include a base portion 1504 and a top portion 1506 which are joined via bolts 1508 and washer 1510. The base portion 1504 can be secured to the top portion 1506 with any known methods, such as via bolts, screws, clips, male/female connectors, and the like.

In another embodiment, the dressout clamp 1502 can have a solid integral base 1512 which is welded, bolted, or molded to the quick connect mount 1500. In other embodiments, the dressout clamp 1502 can have a swivel base allowing for 360 degree rotation, a pivot swivel base allowing for 360 degree rotation as well as a 70 degree pivot in all directions, or a slider base allowing from axial movement along the quick connect mount 1500.

The plunger 420 is configured to travel through an opening in the mounting plate 400 and attach to receptacle 1514 on the quick connect mount 1500. The plunger 420 can be secured in the receptacle 1514 via a male/female fitting, threaded fitting, magnetic fitting, barb fitting, and the like, where the plunger 420 can be depressed to detach/secure the plunger 420 to the receptacle 1514. The plunger 420 can be a spring plunger, or any type of spring-loaded device.

Figure 16:
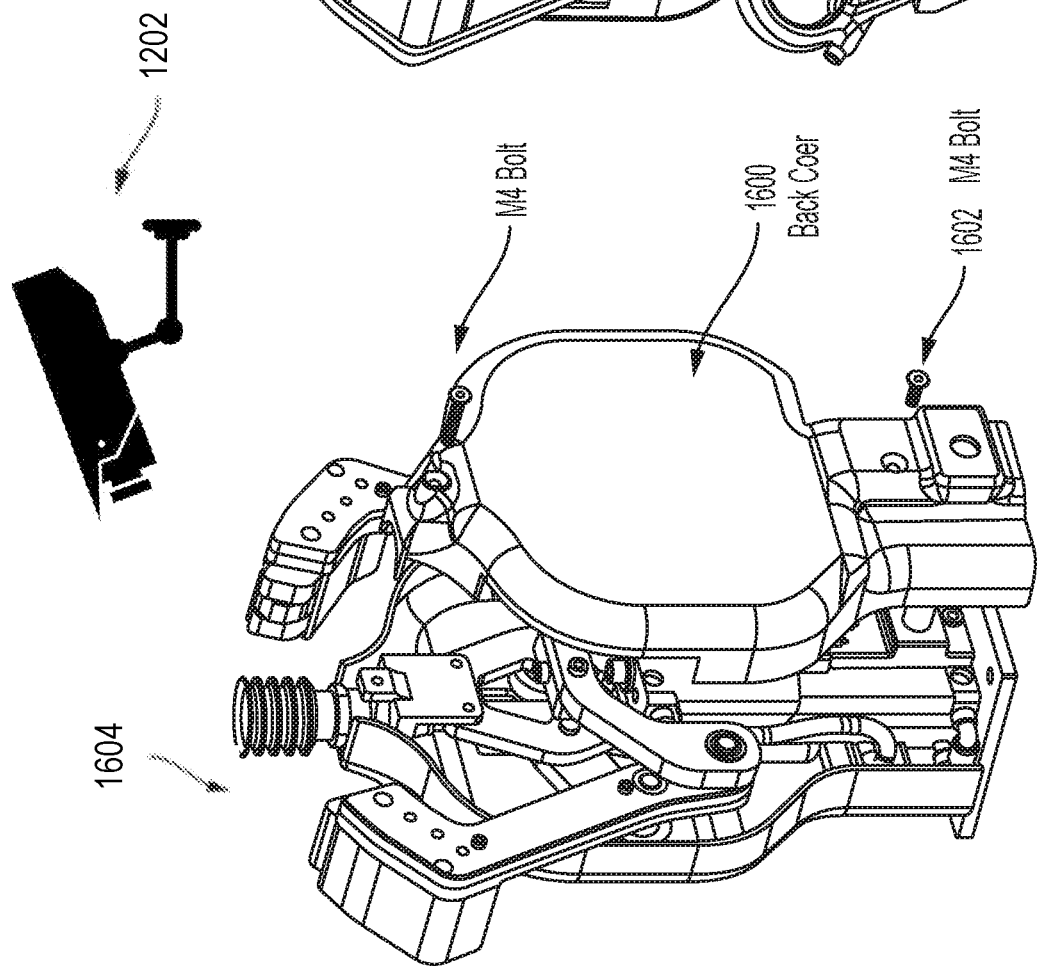
FIG. 16 is a rear perspective view of a robotic gripper according to an embodiment of the present disclosure.

FIG. 16 is a rear perspective view of the robotic gripper 100 according to an embodiment of the present disclosure. The robotic gripper 100 can include a rear cover 1600 which conceals and protects the components of the robotic gripper 100. In an embodiment, rear cover 1600 can be removably secured to the robotic gripper 100 via bolts 1602. The rear cover 1600 can be secured to the robotic gripper 100 with any known methods, such as via bolts, screws, clips, male/female connectors, and the like.

Figure 17:
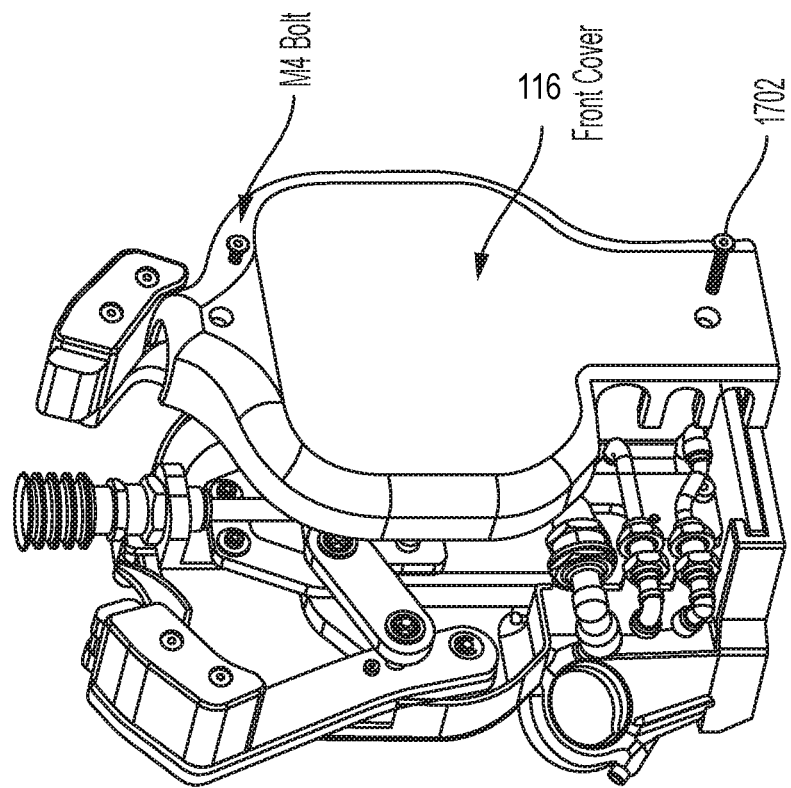
FIG. 17 is a front perspective view of a robotic gripper according to an embodiment of the present disclosure.

FIG. 17 is a front perspective view of a robotic gripper according to an embodiment of the invention. The robotic gripper 100 can include a front cover 116 which conceals and protects the components of the robotic gripper 100. In an embodiment, front cover 116 can be removably secured to the robotic gripper 100 via bolts 1702. The front cover 116 can be secured to the robotic gripper 100 with any known methods, such as via bolts, screws, clips, male/female connectors, and the like.

In an embodiment, the front cover 116 and the rear cover 1600 are formed from nylon or any type of elastomer, plastic, rubber, and the like. In another embodiment, the front cover 116 and the rear cover 1600 are formed from a metal or an alloy. In an embodiment, the front cover 116 and the rear cover 1600 include anti-static properties, and can be coated with, for example, polytetrafluoroethylene or any other type of coating that provides a low coefficient of friction, abrasion and wear resistance, and/or chemical resistance. In an embodiment, the front cover 116 and/or the rear cover 1600 provide a protective covering, and each can be also used for aesthetic and decorative purposes, such as for branding or incorporating a logo.

In another embodiment, the front cover 116 and/or the rear cover 1600 can include an interface or display that is configured to display a message, data, or branding. For example, the interface can display performance or operating data, such as operational time, downtime, component status, component life remaining, status update or notifications regarding repair and/or maintenance of components, temperature data of the robotic gripper 100 and/or its surrounding environment, supply line pressure, supply line leaks, and the like.

In yet another embodiment, the robotic gripper 100 can include a camera 1204 which is configured to capture a scene in a gripping region 1604 (FIG. 16). For example, the camera 1204 can capture images and/or video of the suction gripper 102 and/or gripping finger 104, 106 as they are being maneuvered, manipulated, or performing a grasp or ungrasp operation. The captured data can be displayed on the interface, as well as on a remote interface. In an embodiment, the area that is captured by the camera 1204 is based on a threshold value, such as a radius or distance. For example, the area to be captured can be set at within, for example, a two foot radius from the central axis of the robotic gripper 100. The area to be captured can further be set, for example, within a smaller periphery, such as within a radius surrounding a shared common axis between the proximal gripping finger 104 and the distal gripping finger 106.

In another embodiment, the robotic gripper 100 can include multiple cameras positioned on or adjacent to the suction gripper 102 and/or lip 202, as well as positioned on or adjacent to proximal gripping finger 104, distal gripping finger 106, pads 300, 302, and/or pad 304. In yet another embodiment, an external camera(s) can be mounted adjacent to the robotic gripper 100, and the interface can display data or a feed from the external camera(s).

Figure 19:
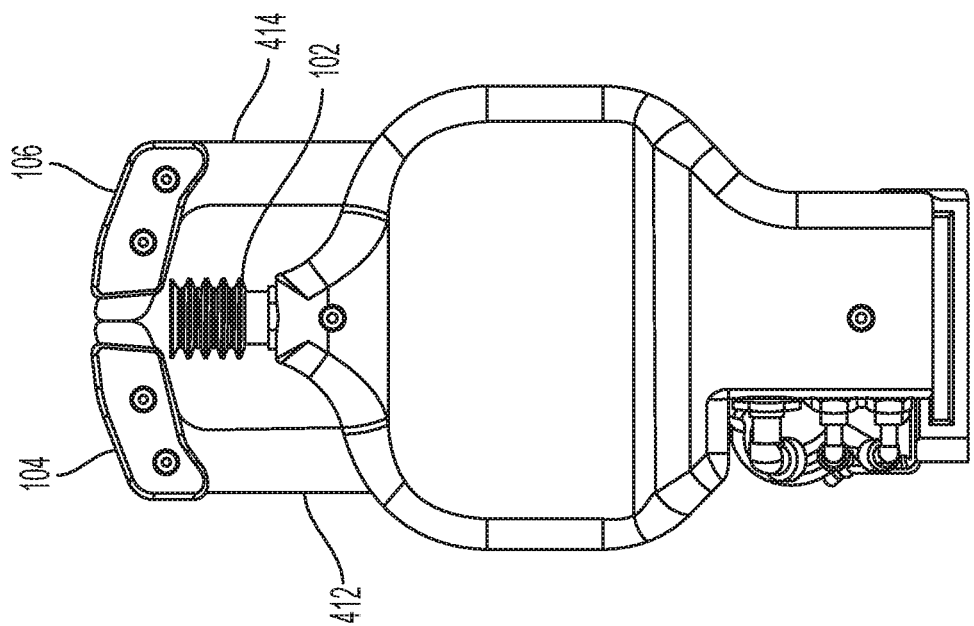
FIG. 19 is a view of a robot gripper with extended gripping fingers according to an embodiment of the present disclosure.
Figure 18:
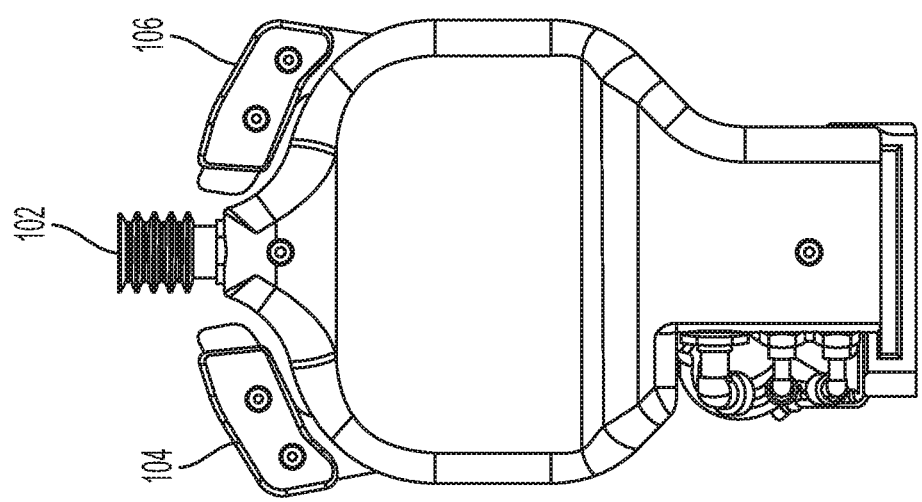
FIG. 18 is a view of a robot gripper with retracted gripping fingers according to an embodiment of the present disclosure.

FIG. 18 is a view of the robot gripper 100 with retracted gripping fingers 104 and 106 according to an embodiment of the present disclosure, and FIG. 19 is a view of the robot gripper 100 with extended gripping fingers according to an embodiment of the present disclosure. The mechanical linkage 108 (FIG. 1) provides a slider-crank assembly allowing the gripping fingers 104, 106 to be retracted as shown in FIG. 18, and extended so that the pads 300, 302, and 304 are raised above the suction gripper 102. In an embodiment, the mechanical linkage 108 provides an in-line, symmetric movement for the proximal linkage 412 and the distal linkage 414, such that both linkages 412, 414 move in a corresponding fashion to one another.

In another embodiment, the mechanical linkage 108 provides an offset, non-symmetric movement for the proximal linkage 412 and the distal linkage 414, such that each linkage can be manipulated independent of the other linkages' movement. In this embodiment, each linkage 412, 414 is coupled to a separate electrical wire or wireless transceiver that allows for bi-directional communication and control data to be received from and transmitted to the electronics connector port 416. The offset, non-symmetric movement allows for one linkage to be moved faster or slower relative to the other linkage, for example.

In an embodiment, the mechanical linkage 108 can be a rocker-slider, slider-rocker, inverted slider crank, or a spatial slider-crank.

Figure 20:
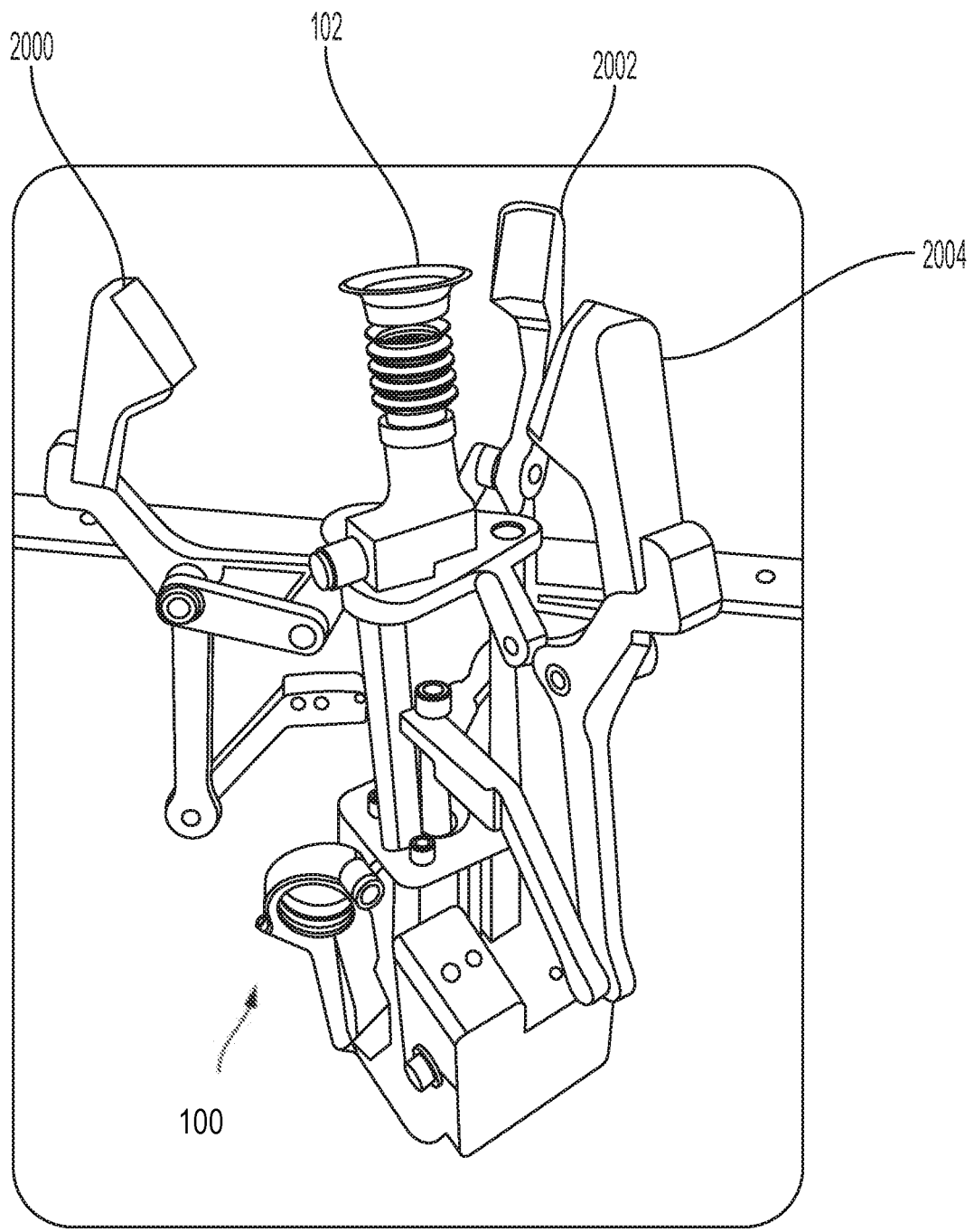
FIG. 20 is a perspective view of a robot gripper with three gripping fingers and a suction gripper according to an embodiment of the present disclosure.

FIG. 20 is a perspective view of a robot gripper with three gripping fingers and a suction gripper according to an embodiment of the present disclosure. In this embodiment, the robotic gripper 100 includes gripping fingers 2000, 2002, and 2004 spaced in an equidistant fashion around suction gripper 102. In another embodiment, the robotic gripper 100 can include any number of gripping fingers, and the gripping fingers can be spaced around suction gripper 102 in an uneven or offset pattern. As discussed above, each gripping finger can include independent pivot or swivel structures that allow for independent vertical and horizontal movement of each gripping finger.

In an embodiment, the robotic gripper 100 is controlled, at least in part, using motion control logic operating via the controller 1202 that includes path planning and collision avoidance features. The motion control logic takes into account certain considerations that are necessary to maintain a safe working environment for the robotic gripper 100, any peripheral or integral physical equipment, as well as the surrounding environment and objects. The motion control logic aims to eliminate, mitigate, and reduce the potential for collisions and damage to the components of the robotic gripper 100, which can include expensive sensors, motors, pneumatic assemblies and assemblies, which can be at risk of damage when proper design protocols are not followed.

In an embodiment, a grasp location on an object may be selected for the robotic gripper 100 based on motion planning methodologies, which can incorporate path planning and collision avoidance algorithms, for example. A path planning algorithm may involve path constraints, such as, for example, avoiding collisions and utilizing the shortest route, which can be input to a constraint-based path planning algorithm which results in an optimal path, or a plurality of paths, to move the robotic gripper 100. In addition, the path planning algorithm may also determine a route for picking up, moving and placing an object.

In an embodiment, the present disclosure utilizes collision scenes in order to inform the robotic control system of where and what types of motions are safe to perform for the robotic gripper 100 during normal operation. For example, in the event of a detected collision or crash, the control system can require an immediate stoppage to the robotic gripper 100, or alternatively, automatically control the robotic gripper 100 to move to or manipulate into a position which can minimize further damage. Such logic can be important in environments where human operators may be present, such as in an assembly line.

Conventional motion planning logic may allow for the robots to move to any location in its environment that passes a plan generation phase, therefore these control systems solely rely on the collision scene to throw out bad position candidates that may interfere with physical parts on the robot. Conventional motion planning logic thus assumes that if the collision scene does not include a real world object, then the robot will hit that real world object, however unlikely an actual collision may be depending on the actual object position and the robot's trajectory.

Figure 21:
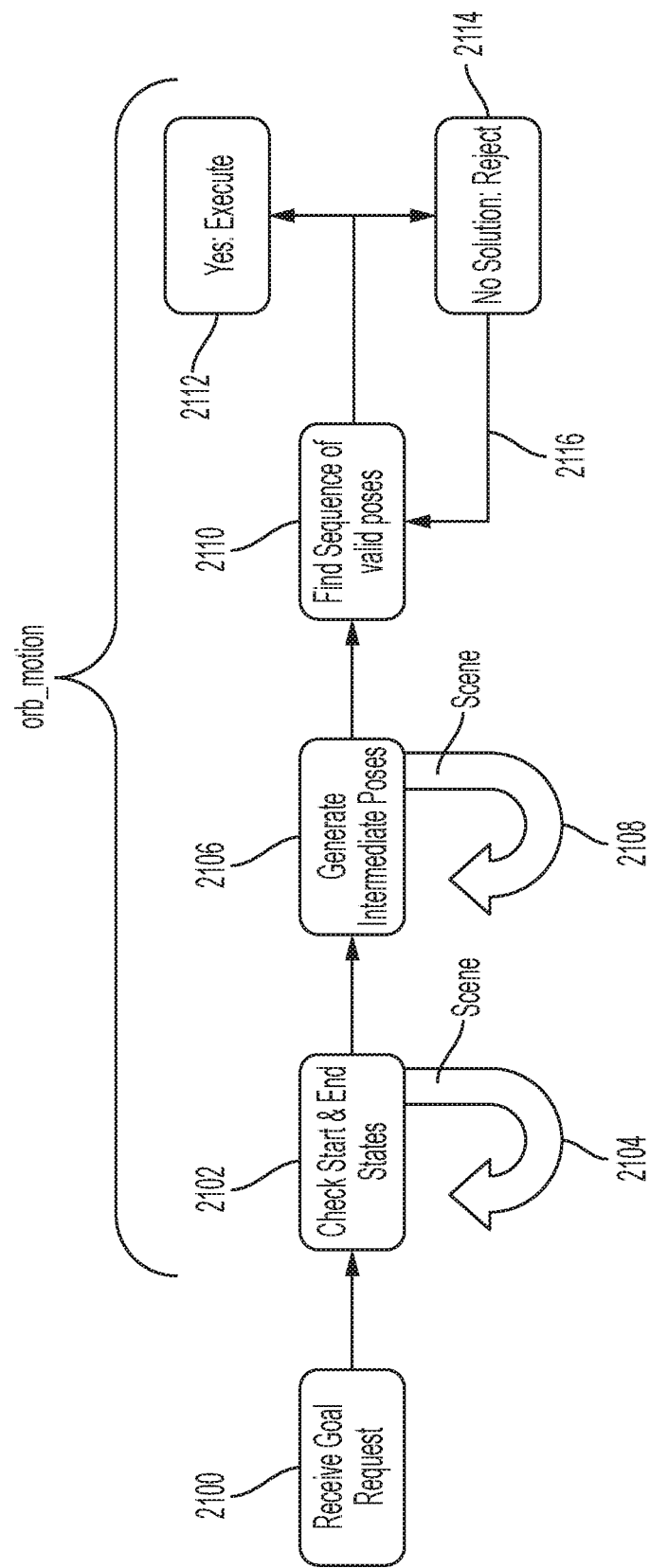
FIG. 21 is a flow diagram of a motion control logic according to an embodiment of the present disclosure.

FIG. 21 is a flow diagram of a motion control logic according to an embodiment of the present disclosure. In step 2100, the control system of the present disclosure receives a goal request, which can be a manually input object location, scan request, and the like, or which can be a software generated request based on sensor data. The goal can be, for example, a pick location, a place/drop location, an assembly location, and the like. Next, at 2102 the control system checks the start and end states of the robotic gripper 100 based on the goal request and any applicable location(s) or position(s) required to fulfill the goal and conducts a path search. In step 2104, a collision scene is generated based on the start and end states of the robotic gripper 100 determined in step 2102. If the collision scene includes real-world objects or potential obstacles or obstructions, then the control system modifies the path or route between the start and end states in step 2102. The control system then proceeds again to step 2104 where another collision scene is generated. If again any real-world objects or potential obstacles or obstructions are detected, the feedback loop continues back to step 2102 so that the control system can modify the path or route once again. In an embodiment, the collision scene can include depth data indicating the orientation, distance, and/or proximity of various objects and the robotic gripper 100 within the collision scene.

If in step 2104 there are no real-world objects or potential obstacles or obstructions detected in the collision scene, the control system proceeds to step 2106 where the control system generates intermediate poses for the robotic gripper 100. In step 2018, a collision scene is generated based on the intermediate poses of the robotic gripper 100 determined in step 2106. If the collision scene includes real-world objects or potential obstacles or obstructions, then the control system modifies intermediate poses in step 2106. The control system then proceeds again to step 2108 where another collision scene is generated. If again any real-world objects or potential obstacles or obstructions are detected, the feedback loop continues back to step 2106 so that the control system can modify the intermediate poses once again.

If in step 2108 there are no real-world objects or potential obstacles or obstructions detected in the collision scene, the control system proceeds to step 2110 where the control system determines a sequence of valid poses for the robotic gripper 100. The control system then determines if the valid poses will provide a solution for the goal request, and if so, then in step 2112, the robotic gripper 100 is controlled based on the sequence of valid poses determined in step 2110. If, however, the control system determines that the valid poses will not provide a solution for the goal request, then the process ends at step 2114.

In an embodiment, if no solution is found, a feedback loop 2116 allows the control system returns the control system to step 2110 in order to find another sequence of valid poses. The process then continues as described above.

Figure 22:
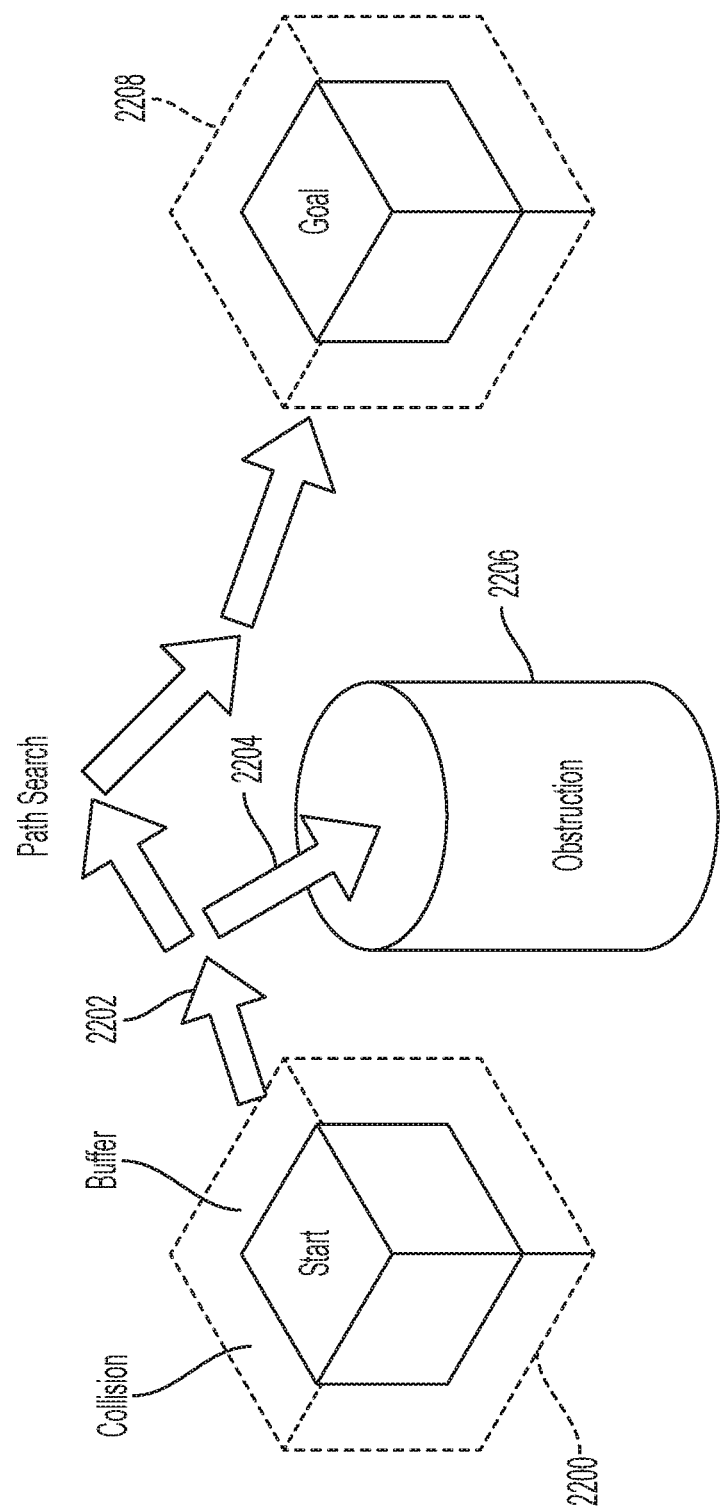
FIG. 22 is a block diagram of a path search flow according to an embodiment of the present disclosure.

FIG. 22 is a block diagram of a path search flow according to an embodiment of the present disclosure. State 2200 represents a start state for the robotic gripper 100, where a buffer area 2210 is determined to be a safe operating space surrounding the robotic gripper 100. At the outer bounds of the safe operating space is a collision zone, which can be a space where the control system either has identified a real-world object or potential obstacle or obstruction, or where the space has not been modeling and a collision cannot be ruled out. Path 2202 is a safe operating path that has been determined by the control system, and path 2204 is a collision path that has been determined by the control system based on the detection of obstruction 2206. The path 2202 leads the robotic gripper to a goal position, or end state 2208. In an embodiment, the path search flow can be utilized in steps 2104, 2108, and 2110 shown in FIG. 21, and described above.

In yet another embodiment, the safe operating space can include an area where a collision or contact with another object or structure is desired. Thus, the safe operating space is not limited to an area that is free from external contact or collisions.

In an embodiment, the control system can utilize motion control logic to control various operational states of the robotic gripper 100. For example, in a first operational state, the movement of the robotic gripper 100 about an arm, such as a cantilevered arm, or along a track or guide system, can be controlled, in order to navigate the robotic gripper 100 around an environment, such as a sort station or assembly station.

In a second operational state, the movement of only the gripping fingers 104, 106 and mechanical linkage 108 can be controlled using the motion control logic, such that each finger can be simultaneously or independently controlled in order to avoid collisions.

In a third operational state, only the movement or actuation of the suction gripper 102 can be controlled using the motion control logic, such that the suction gripper 102 is extended, retracted, or provided with suction pressure in order to avoid collisions.

In a fourth operational state, the movement of the gripping fingers 104, 106, mechanical linkage 108, and the suction gripper 102 can all be simultaneously or independently controlled in order to avoid collisions.

Figure 23:
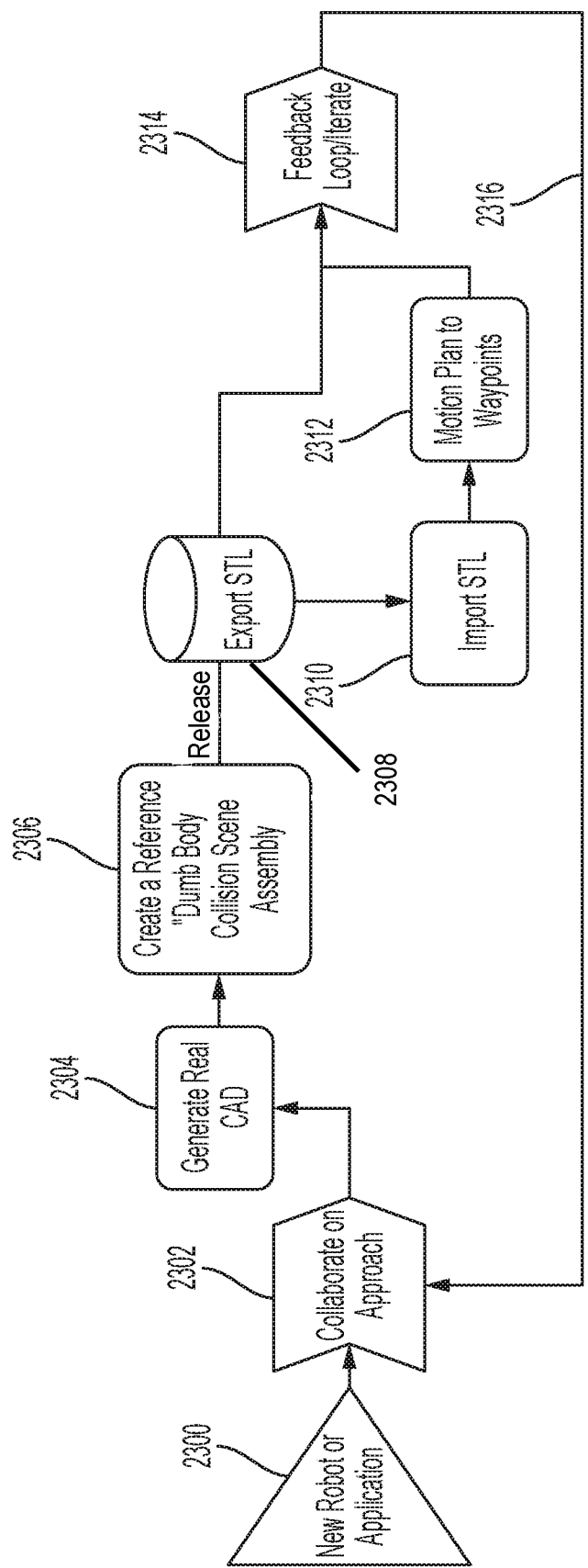
FIG. 23 is a flow diagram of a generating a collision scene for a robotic gripper environment according to an embodiment of the present disclosure.

FIG. 23 is a flow diagram of a generating a collision scene for a robotic gripper environment according to an embodiment of the present disclosure. In step 2300, the robotic gripper 100 application or environment is determined. For example, applications can be specific to the use of the robotic gripper 100, such as pick and place operations, assembly operations, packaging operations, etc. The robotic gripper 100 properties, such as, but not limited to, dimensions, size, hardware, volume, area, maximum finger and suction extension length, and minimum required buffer area can be determined. In addition, an origin with minimal disruption or confusing translation in the environment or space can be used as a starting state, waypoint, position, orientation, and/or location. In an embodiment, the control system is configured to control and/or drive all mechanical assemblies in the robotic gripper 100 from the starting state mates in mechanical assemblies should be driven from the starting state.

In step 2302, various personnel collaborate on a collision scene generation approach. The personnel can include, for example, hardware engineers and designers, software engineering and designers, structural engineers and designers, architects, mechanical engineers, biomechanical engineers, supply chain analysts, and the like.

In an embodiment, the starting state and robotic gripper 100 properties can be generated from cached model consisting of pre-determined plans which include known or predicted buffer values and expected geometries of known objects that may be manipulated by the robotic gripper 100. In another embodiment, a dynamic model, which can be an online or real-time learning model, is utilized by the control system can manipulate and re-position various joints, mechanical linkage 108, gripping fingers 104, 106, and/or suction gripper 102 to match a required shape based on identified objects in the environment, such as in a sorting bin or station.

In an embodiment, both the cached model and dynamic models can be utilized, such that a cached model is used to initiate the control, and then a dynamic model is used once object manipulation has begun.

In step 2304, a computer aided design (CAD) is utilized to build a three-dimensional model of the robotic gripper 100 and surrounding environment. In an embodiment, learned historical data, such as from a machine learning, reinforcement learning, or the like, can be utilized as an input into the CAD process.

In an embodiment, the buffer values can be determined by the control system using a "dumb" model in step 2306, which is a simplified model that decreases up computation time to calculate possible collisions. In the "dumb" model, pre-determined boundaries are used based on various size, shape, dimension, etc., values, instead of a dynamic learning model which calculates optimal buffer values based on actual objects in the environment, or a cached model which uses known object values to determine appropriate buffer values.

In each of the models (i.e., dumb, cached, and dynamic), the buffer values can also account for known manufacturing variations and tolerances of components and can automatically account for or add extra buffer for sharp corners, tight spaces (e.g., nooks and crannies), and the like to prevent motion smoothing algorithms from accidentally clipping edges or colliding with corners, edges, or real-world boundaries.

In an embodiment, the control system balances a ratio between the buffer values and the performance capabilities of the robotic gripper 100 so as to ideally maximize buffer values while simultaneously maximizing performance capabilities. In an embodiment, the control system can be instructed, either automatically via software control, or via operator control, to apply a preference to either maximizing buffer values or maximizing performance capabilities. In this embodiment, for example, full maximizing of buffer values may lead to a degradation of performance capabilities (e.g., in terms of speed, maneuverability, accuracy, precision, etc.), and vice versa.

Once the control system completes the modelling process in step 2306, the data is exported to a CAD publishing system in step 2308, such as, for example, SolidWorks®, where the modeled data is published into a collision scene file. In step 2310, the collision scene file is imported into the control system. In step 2313, the control system incorporates the collision scene file into a motion plan and creates waypoints as part of the path planning process. In step 2314, the path plan is simulated and tested using a feedback loop, and if necessary, the process continues to iterate in step 2316. For example, if the feedback loop determines that the collision space modeling is not optimal based on pre-defined thresholds, the iteration occurs. In this scenario, the collision scene file, motion plan, etc., can be used as inputs at step 2302.

In yet another embodiment, the published collision scene file generated in step 2308 is simulated directly in the feedback loop in step 2314.

Figure 24:
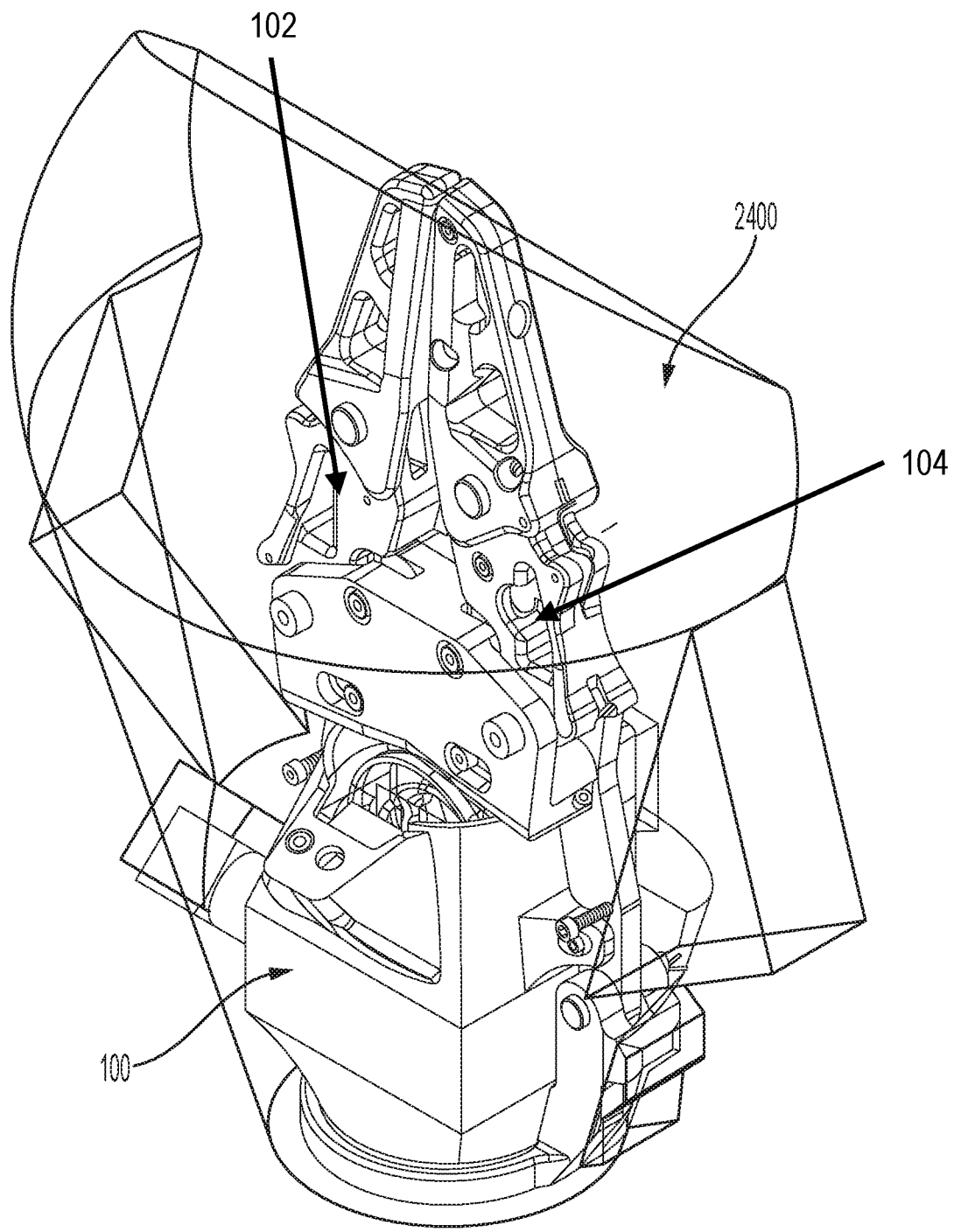
FIG. 24 is a collision scene depicting a buffer with a closed gripping finger state according to an embodiment of the present disclosure.

FIG. 24 is a collision scene depicting a buffer with a closed gripping finger state according to an embodiment of the present disclosure. The collision scene includes a buffer zone 2400 that is calculated as described above and in FIG. 23. As shown, the robotic gripper 100 has gripping fingers 104 and 106 which are in a closed state, and the buffer zone 2400 illustrates the collision free space in which the gripping fingers may extend without interference with a known or unknown object, obstacle, or obtrusion.

Figure 25:
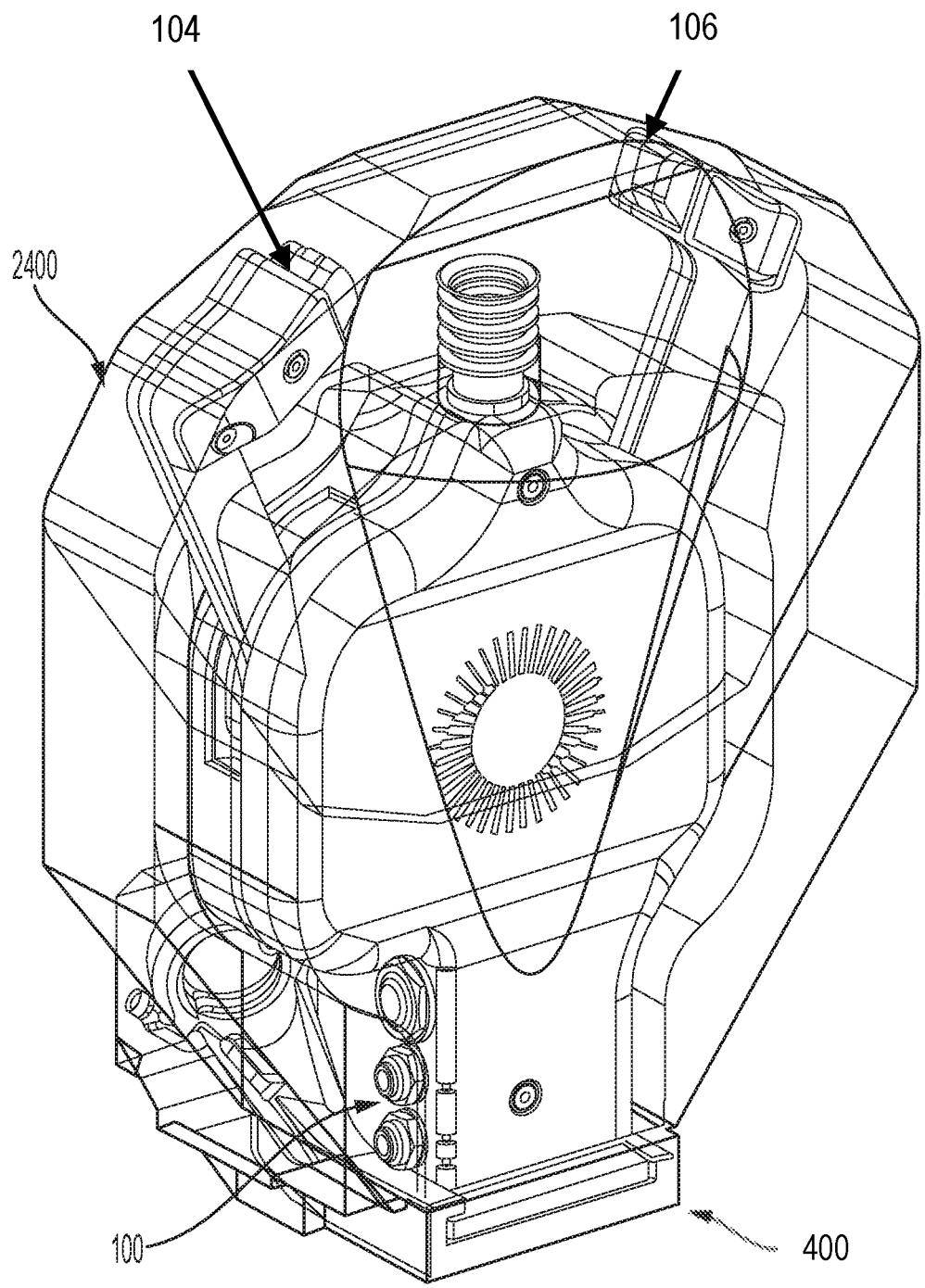
FIG. 25 is a collision scene depicting a buffer with an open gripping finger state according to an embodiment of the present disclosure.

FIG. 25 is a collision scene depicting a buffer with an open gripping finger state according to an embodiment of the present disclosure. As shown, the robotic gripper 100 has gripper fingers 104 and 106 that extend to the boundary of the buffer zone 2400. In an embodiment, the control system prevents the robotic gripper 100 from extending or travelling outside of the buffer zone 2400. However, the buffer zone 2400 constraint may be overridden by operator intervention, or if the control system detects a fault, failure, or a condition that otherwise impedes or prevents operation of the robotic gripper 100.

As shown in FIGS. 24 and 25, the buffer zone 2400 extends around the entire robotic gripper 100, including the mounting plate 400. In an embodiment, the collision scene may be generated only for moving components, such as appendages, linkages, fingers, grippers, cups, and the like, where the buffer zone only constrains these moving components, and not any fixed portions of the robotic gripper 100 that do not move independent from a mounting structure, such as an arm, dolly, crane, track, mounting surface, etc.

While the principles of the disclosure have been illustrated in relation to the exemplary embodiments shown herein, the principles of the disclosure are not limited thereto and include any modification, variation or permutation thereof.

What is claimed is:

1. A method of controlling a robotic apparatus for manipulating objects, comprising:
    capturing an image of an environment surrounding the robotic apparatus;
    generating a collision scene from the image, wherein the collision scene indicates the presence or absence of objects in the environment surrounding the robotic apparatus;
    generating a first pose for the robotic apparatus;
    generating a motion path for the robotic apparatus;
    determining if the first pose will allow the robotic apparatus to complete the motion path based on comparing the motion path to the collision scene; and
    generating a second pose if the first pose does not allow the robotic apparatus to complete the motion path.

2. The method of claim 1, wherein the first and second poses include a specific orientation of at least one finger coupled to the robotic apparatus.

3. The method of claim 1, wherein the first and second poses include a specific orientation of at least two fingers coupled to the robotic apparatus.

4. The method of claim 1, wherein the collision scene is generated based on capturing an image within a threshold area surrounding the robotic apparatus.

5. The method of claim 1, further comprising modifying the motion path if the first pose or the second pose does not allow the robotic apparatus to complete the motion path.

6. The method of claim 1, wherein the motion path includes waypoints between a start state and an end state.

7. The method of claim 1, wherein the first pose and the second pose include an extension distance for a suction gripper coupled to the robotic apparatus.

* * * * *